United States Patent [19]

Schwartz et al.

[11] 3,906,480

[45] Sept. 16, 1975

[54] DIGITAL TELEVISION DISPLAY SYSTEM EMPLOYING CODED VECTOR GRAPHICS

[75] Inventors: Alfred Alexander Schwartz, Gaithersburg, Md.; Joseph Robert Stewart, Lexington, Ky.

[73] Assignee: International Business Machines Corporation, Armonk, N.Y.

[22] Filed: Feb. 23, 1973

[21] Appl. No.: 335,388

[52] U.S. Cl. .......................... 340/324 AD; 340/172.5
[51] Int. Cl. .......................... G08b 5/36
[58] Field of Search .......................... 340/324 AD

[56] References Cited

UNITED STATES PATENTS

| | | | |
|---|---|---|---|
| 3,345,458 | 10/1967 | Cole et al. | 340/324 AD X |
| 3,400,377 | 9/1968 | Lee | 340/324 AD |
| 3,581,290 | 5/1971 | Sugarman | 340/172.5 |
| 3,631,457 | 12/1971 | Hamada et al. | 340/324 AD |
| 3,641,558 | 2/1972 | Cook et al. | 340/324 AD |
| 3,668,687 | 6/1972 | Hale | 340/324 AD |
| 3,675,232 | 7/1972 | Strout | 340/324 AD |
| 3,713,135 | 1/1973 | Vincent-Lazecki | 340/324 AD |
| 3,725,723 | 4/1973 | Colston et al. | 340/324 AD |

*Primary Examiner*—David L. Trafton
*Attorney, Agent, or Firm*—John E. Hoel

[57] ABSTRACT

A digital television display system is disclosed which decomposes the vectors to be displayed, into elemental vector segments which are encoded as vector symbols selected from a symbol set by a vector segment encoder. The encoded vector segment words are loaded in the order generated into a threaded queue buffer which sorts and stores the vector words in threaded queues having the same raster line location. The encoded vector segment words are transferred from the threaded queue buffer grouped by common raster line location and are loaded in an elastic refresh buffer. The elastic refresh buffer cyclically stores the encoded vector segment words in a packed cluster which expands as new data is loaded. Encoded vector segment words are cyclically transferred from the elastic refresh buffer to a symbol generator which decodes the words into symbols drawn from the alphanumeric and vector segment symbols in the symbol set. Patterns of raster illumination signals generated by the symbol generator are transferred to a partial raster assembly store which assembles the video output data to be displayed on a digital television monitor. The system has the capability of storing each vector in a compacted form while retaining its attributes and identity in storage. This permits the accessing of individual vectors and the storage of vectors having different colors, intensities, or other attributes in a single storage module.

8 Claims, 20 Drawing Figures

DTV SYSTEMS

VECTOR OCTANT CODING

CODED VECTOR DTV DISPLAY SYSTEM

FIG. 5 Q BUFFER LOADING
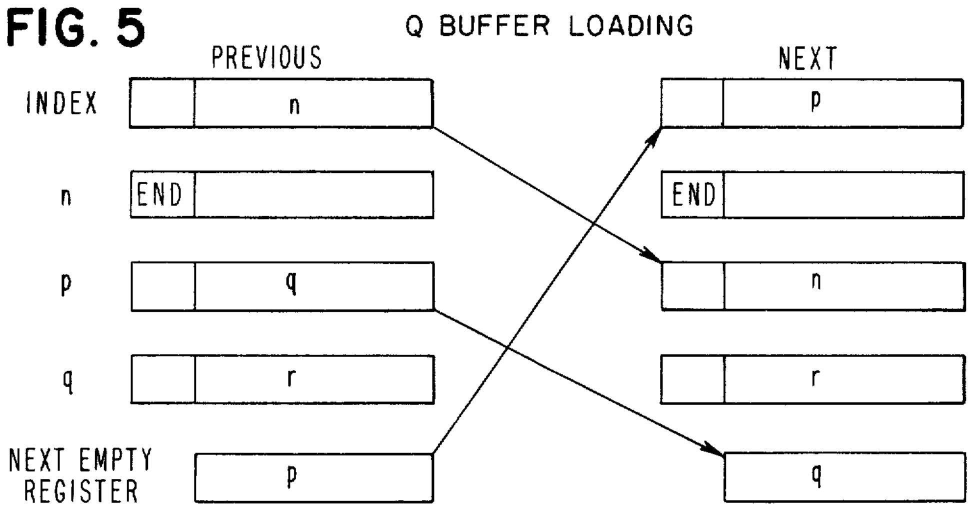
FIG. 6 Q BUFFER ORGANIZATION
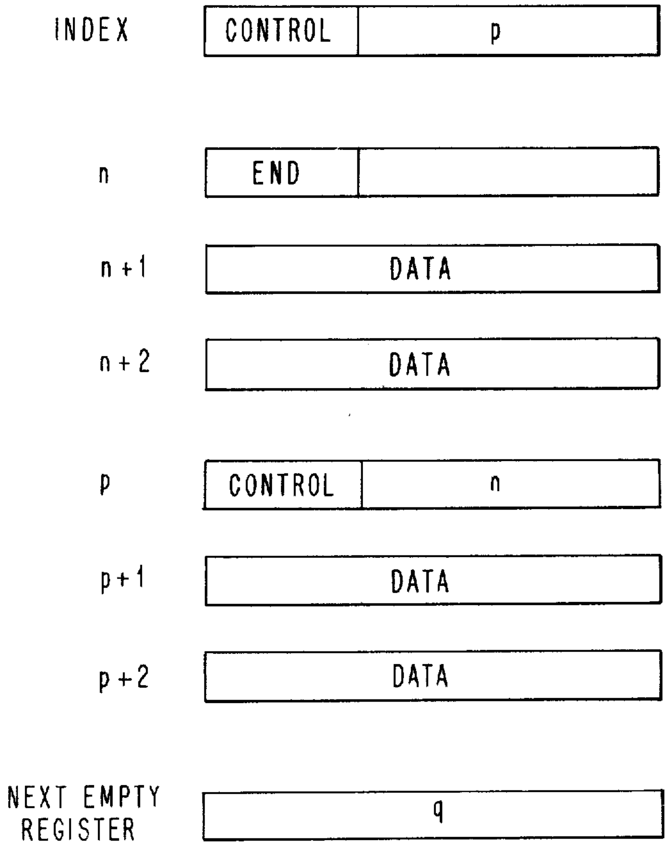

FIG.10 CODES AND ADDRESS MODIFICATION
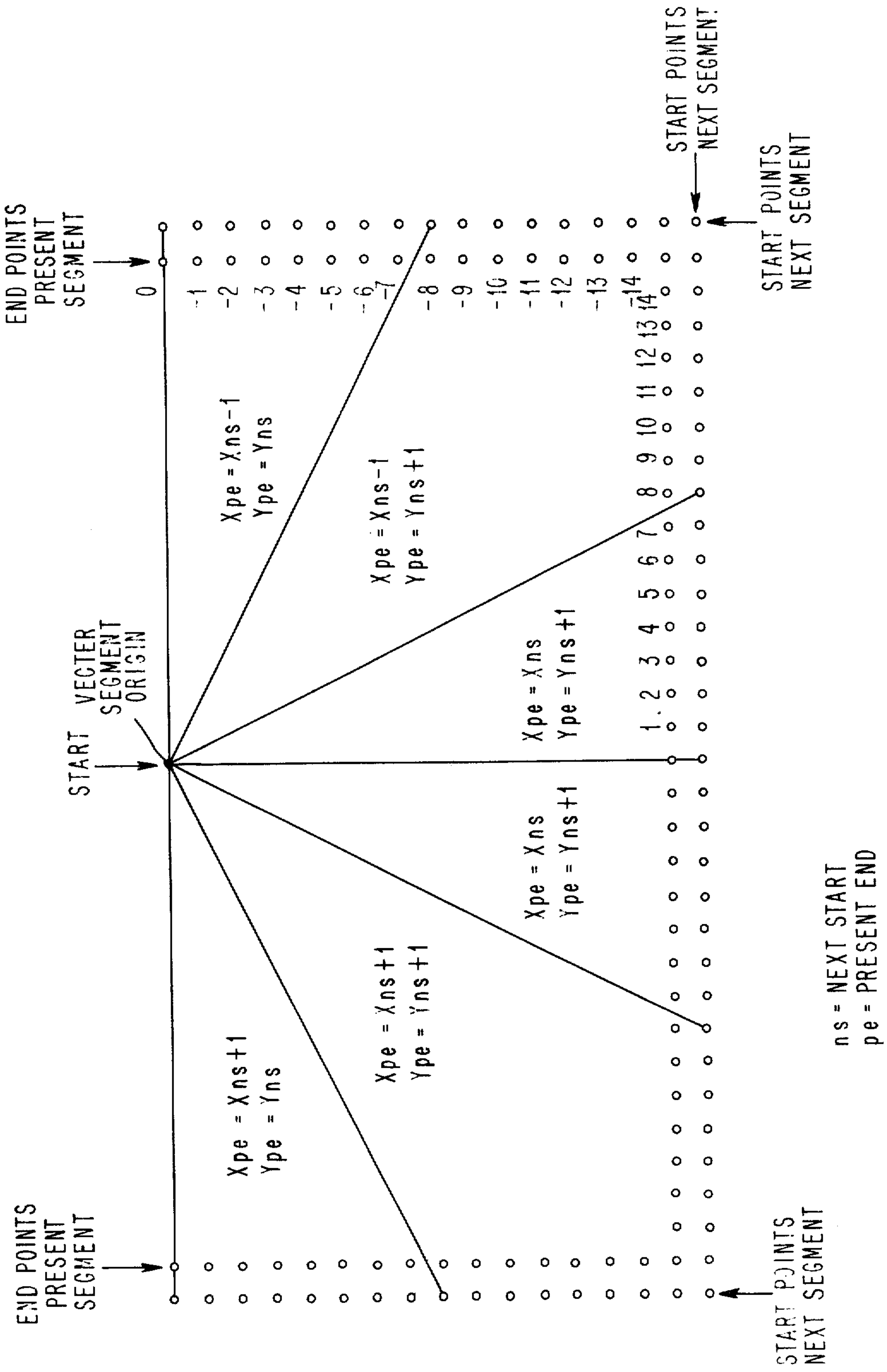

THREADED QUEUE BUFFER

SAMPLE DISPLAY (X,Y) = SUBVECTOR ORIGIN

VECTOR 1:
BLUE - SUBVECTOR SYMBOL CODE 7
(161,224)
(177,216)
(193,208)
(209,200)
(225,192)

VECTOR 2:
RED - SUBVECTOR SYMBOL CODE 15
(193,224)
(209,208)
(228,192)

VECTOR 3:
GREEN - SUBVECTOR SYMBOL CODE 23
(209,224)
(217,208)
(225,192)
(232,176)

ALPHA NUMERIC - B - SYMBOL CODE 65
(161,184)

DIGITAL TELEVISION DISPLAY SYSTEM EMPLOYING CODED VECTOR GRAPHICS

FIELD OF THE INVENTION

The invention disclosed herein relates to data processing devices and more particularly relates to digital television display systems.

BACKGROUND OF THE INVENTION

Digital television systems in the prior art produced line drawings by storing one video bit for every element of the picture. FIG. 1 shows a typical prior art digital television display system. Vectors and characters designated to be displayed by the host processor 6 would be constructed from an assembly of video bits generated by the character generator 10 and the vector generator 12 and assembled for display in a raster assembly storage 14, usually comprising a core memory. In digital television displays having a 1024 raster matrix, a capacity of one million video bits would have to be stored in the raster assembly store 14. Once assembled, the sequence of one million video bits would be outputted from raster assembly store 14 by means of the multiplexor 16 to a designated channel for storage on a disk refresh buffer 22. In the event that the digital television display was a three color display comprising three primary components, three separate sets of tracks would be required to store one million bits each for the three primary colors to be displayed. One substantial drawback in prior art displays such as is depicted in FIG. 1, is that any alteration in the displayed picture would require either the generating of a new picture or the moving all one million bits from the disk 22 back to the raster assembly storage 14, modifying the desired bits, and returning the one million bits to the disk refresh buffer 22. Thus, to effect the erasure of a single vector, it would be necessary to reassemble the entire raster in the assembly store 14. In the event that two vectors crossed one another, the process of erasing a first vector would remove video bits common to both vectors, leaving the remaining vector with a gap separating the components on either side of the erased vector.

Once the image is written to the disk refresh buffer 22, the vectors loose their identity. This is, each bit is written to the disk 22 and on to the display 34 in the same way. To produce multiple intensity or color with this explicit technique, it is necessary to add additional storage units which operate in synchronism. As a result, producing multiple intensity displays, color displays or other effects requiring individual treatment of vectors, usually requires two or three times the storage required for a single channel.

A problem in the art has been to store each vector in a compacted and identifiable form to enable the retention of its attributes and identify without the necessity of allocating large amounts of storage space. Without the use of a large capacity memory, which is inconsistent with I/O equipment, the prior art has been unable to access individual vectors in refresh storage or to store vectors having different colors, intensity levels, or other attributes in the same storage module.

OBJECTS OF THE INVENTION

It is an object of the invention to store vector display data in a more compacted form than is known in the prior art.

It is another object of the invention to store vector display data so as to retain its identity and special attributes such as color, intensity, or blink.

It is still another object of the invention to decompose the vectors to be displayed, into vector segments which are encoded as vector symbols from a symbol set, in a more improved manner than has been performed in the prior art.

A further object of the invention is to store vector display words loaded in a random sequence, so as to be sorted into threaded queues of equal raster line location, in a more improved manner than has been accomplished in the prior art.

Still a further object of the invention is to cyclically store display data in a packed cluster which expands as new data is loaded.

SUMMARY OF THE INVENTION

A coded vector digital television display system is disclosed which comprises a minicomputer or other means for calculating the origin, slope and length of the vector to be represented by the display system. A vector segment encoder having an input connected to the minicomputer accepts the origin, slope and length data and processes that data to yield a sequence of vector segments words representing a sequence of component vector segments of the vector to be represented. Each component vector segment is a standardized symbol contained in a symbol set and specified by a symbol code. Each vector segment word contains coordinate data specifying an X, Y origin, a length, and the symbol code. A threaded queue buffer having an input connected to the vector segment encoder accepts vector segment words having a random sequence of X, Y origin values and sorts and stores these words in threaded queues of equal Y value. An elastic refresh buffer with an input connected to the threaded queue buffer interrogates the threaded queue buffer for vector segment words having a Y value specified by the elastic refresh buffer and stores the vector segment words accepted from the queue, in a packed cluster ordered by Y. The elastic refresh buffer cyclically reads the vector segment words from the top of the packed cluster of data and cyclically outputs each word for decoding and display, rewriting each vector segment word at the bottom of the packed cluster. The elastic refresh buffer cyclically writes at the bottom of the packed cluster of data in the order of Y value, new vector segment words inputted from the threaded queue buffer while suspending the cyclic reading from the top of the packed data cluster. The elastic refresh buffer cyclically reads from the top of the packed data cluster, old vector segment words to be purged from the elastic refresh buffer while suspending the cyclic rewriting at the bottom of the packed data cluster. The organization of the elastic refresh buffer permits the accessing of individual vectors and the storage of vectors having different colors, intensities or other attributes. The interaction of the elastic refresh buffer and queue permits the cyclic refresh of the display and yet accomodate selective additions to and deletions from the data displayed. A symbol generator having an input connected to the elastic refresh buffer accepts the vector segment words cyclically outputted thereby and decodes the symbol code in a vector segment word from the symbol set which is stored therein. The symbol generator generates a pattern of raster illumination signals corresponding to the vector segment to be depicted. A partial raster assembly storage having an input connected to the symbol generator accepts the pattern of raster illumination signals and stores the pattern, ordered by a value of X and Y, for readout and display. The symbol generator transmits to the partial raster assembly storage the X Y origin for the vector segment to be displayed to serve as the location address for the pattern of signals stored in the partial raster assembly storage. The symbol generator transmits to the partial raster assembly storage the length of the vector segment to be displayed to serve as the signal for selectively truncating the pattern of signals stored in the partial raster assembly storage. A digital television monitor having an input connected to the partial raster assembly storage accepts the pattern of signals store therein for illumination of the display. The resulting system is capable of individually storing each vector segment in a compacted and identifiable form so as to retain its attributes and identity while in refresh storage. This enables the selective display and modification of vectors without disturbing the balance of the picture. The system permits the display of several channels, color, intensities, or other attributes from a single storage module.

DESCRIPTION OF THE DRAWINGS

The foregoing and other objects, features and advantages of the invention will be apparent from the following more particular description of the preferred embodiments of the invention, as illustrated in the accompanying drawings.

FIG. 5 depicts a schematic diagram of the threaded queue buffer loading process.

FIG. 6 depicts a schematic diagram of the threaded queue buffer organization.

FIG. 10 depicts the technique employed by the vector segment encoder for maintaining graphical continuity between successive vector segments.

DISCUSSION OF THE PREFERRED EMBODIMENTS

Figure 2A:
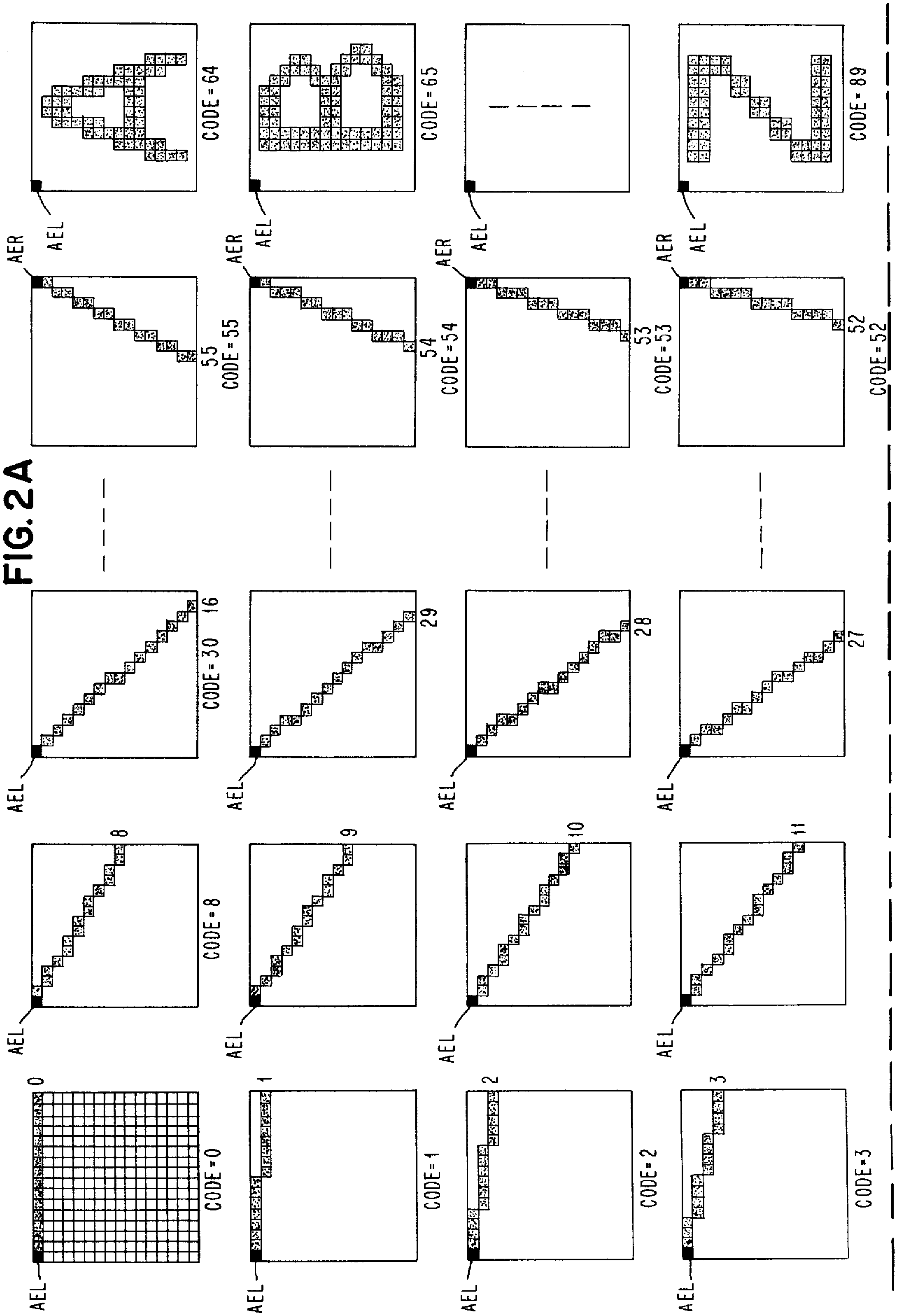
FIGS. 2A and 2B depict the coded vector segment and coded alphanumeric symbol set.
Figure 2B:
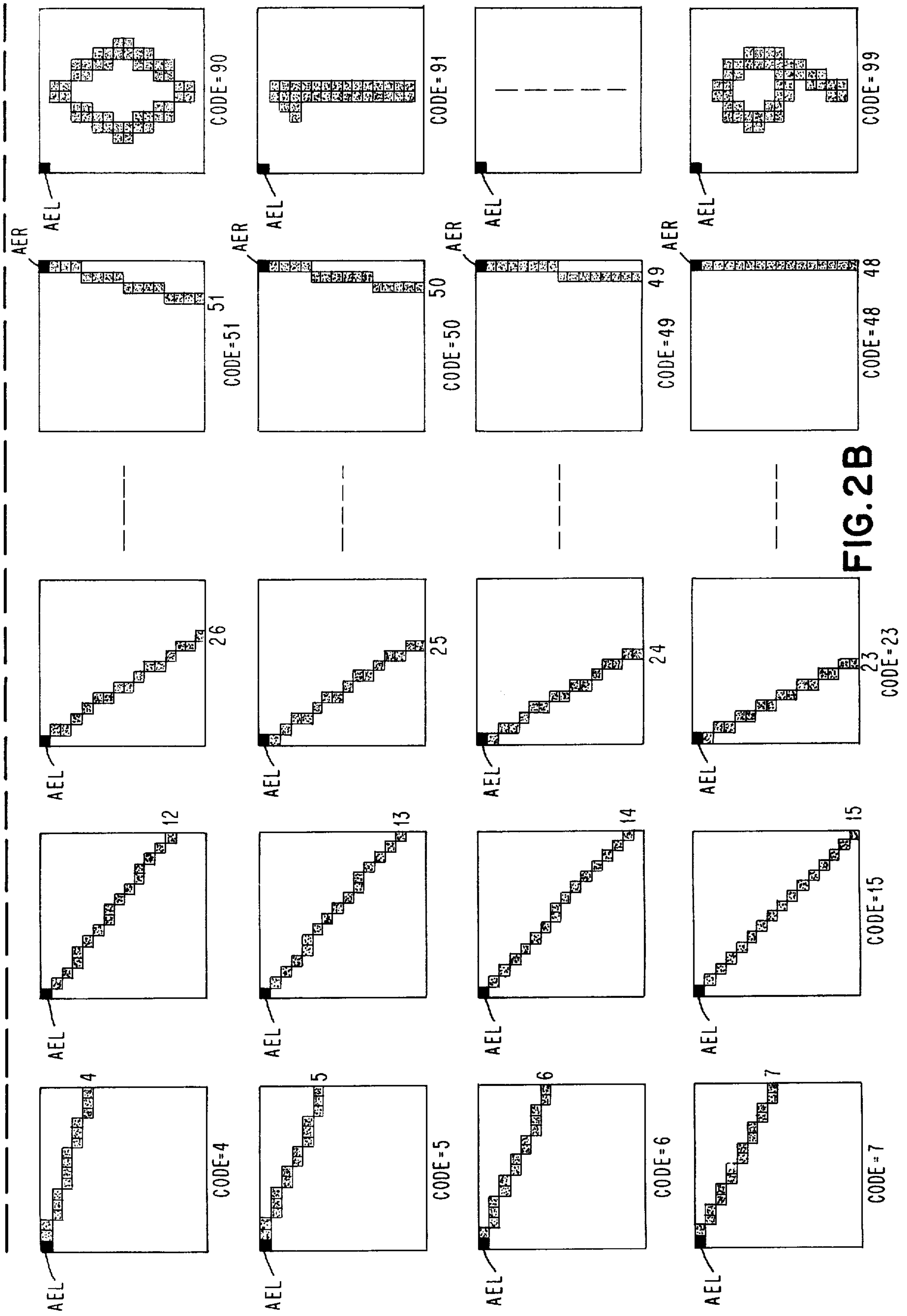

Coded Vector Graphics: One element of the digital television system invention is the use of a set of subvector codes. These codes are created by assigning a number to every line which can exit from a basic subset of display elements in a rectangular pattern when one end of the line is in the upper left or upper right element as is shown in FIG. 2. The basic rectangle is 16 by 16 video bits Subvectors beginning at the upper left corner at the bit entitled "Address Element Left" (AEL) are assigned numbers from 0 to 31. Subvectors beginning at the upper right of the rectangular pattern at the video bit designated address element right (AER) are assigned codes from 32 to 63.

Figure 9:
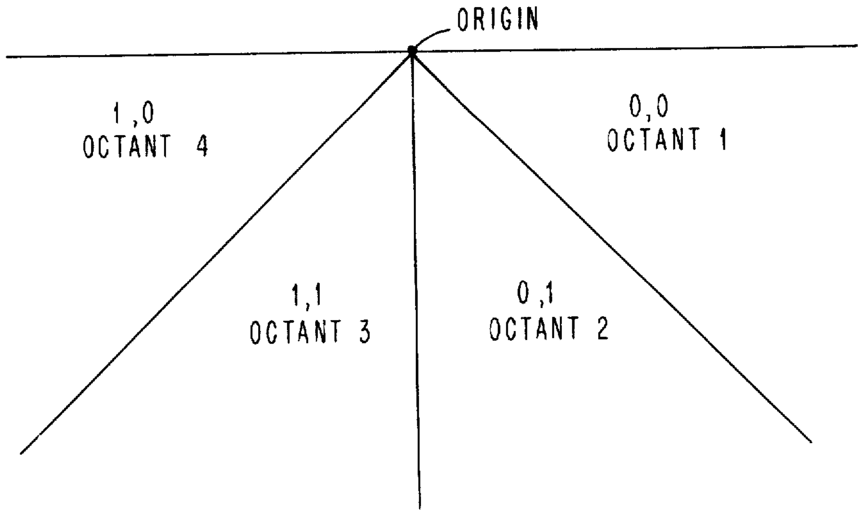
FIG. 9 depicts the vector octant coding scheme.

Subvectors having an origin at the upper left corner, AEL of the basic 16 × 16 element rectangle of FIG. 2, lie in either the first or second octant of FIG. 9. In the first octant, subvectors may terminate on any of the 16 elemental squares in the rightmost column of the 16 × 16 element rectangle. These squares are numbered in ascending order from the top, starting with 0 at the top and ending with 15 at the bottom. In the second octant, subvectors may terminate on any of the 16 elemental squares in the bottom row of the 16 × 16 element rectangle. These squares are numbered in ascending order from left to right, starting with 16 on the left and ending with 31 on the right.

Subvectors having an origin at the upper right corner, AER of the basic 16 × 16 element rectangle of FIG. 2, lie in either the third or the fourth octant of FIG. 9. In the fourth octant, subvectors may terminate on any of the 16 elemental squares in the left-most column of the 16 × 16 element rectangle. These squares are numbered in ascending order from the top, starting with 32 at the top and ending with 47 at the bottom. In the third octant, subvectors may terminate on any of the 16 elemental squares in the bottom row of the 16 × 16 element rectangle. These squares are numbered in ascending order from right to left, starting with 48 on the right and ending with 63 on the left.

All vectors to be displayed are assembled by placing these subvectors in concatenated fashion on the DTV screen. The lower most subvector of each vector may be truncated to provide the proper length. The subvectors are addressed by their upper right video elements AER or their upper left corner video elements AEL. A complete symbol set of 256 symbols can be encoded with 8 binary bits and can include in addition to the 64 subvector elements shown in FIG. 2, a complete set of alphanumeric characters from A to Z and from 0 to 9 and specialized characters which can be designated by the operator or programmer to produce special effects. Among the special effects which might be generated are area fill-in, cross hatching, shading or colored blocks. Other special symbols may be characteristic of the application in which the system is employed, for example in air traffic control, special tracking symbols may be used. The coded vector DTV system can assemble these specialized symbols by abutting, concatenating, and overlaying so as to form macro symbols for display. The capability to locate programmed symbols in randomly selected locations on the raster can be used to produce a wide variety of special effects.

Figure 3:
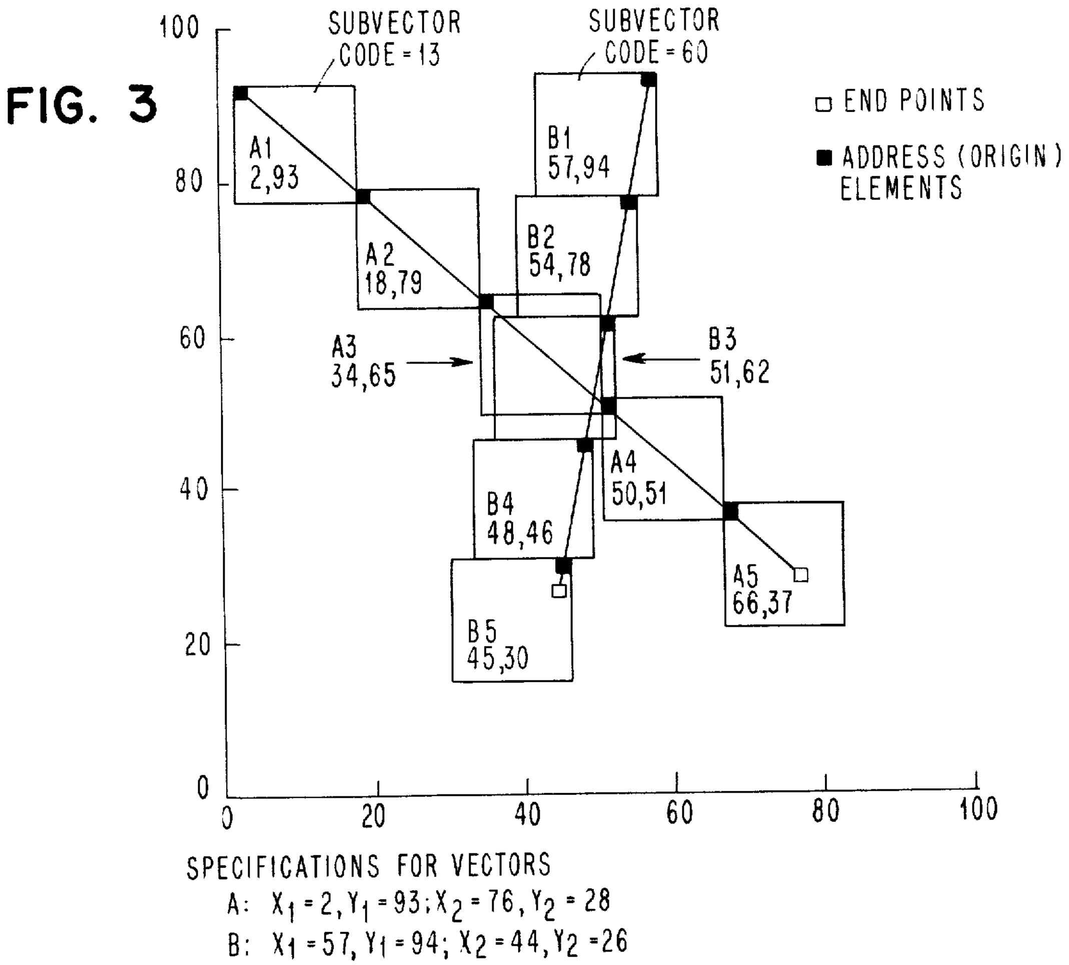
FIG. 3 is an example of the decomposition of vectors to be displayed into vector segment symbols such as are shown in FIG. 2.

FIG. 3 shows an example of the representation of two vectors A and B as a concatenated sequence of subvectors. Vector A uses subvectors from the upper left origin group (codes 0-31 and in particular uses subvector code 13). Vector B uses subvectors from the upper right origin group (codes 32–63 and in particular employs subvector code 51. Vector A has an origin of (X, Y) equal (2, 93) and a terminating point of (X, Y) equal (76, 28). Vector A is decomposed into the subvector elements A1 having an address element left (AEL) of (X, Y) equal (2, 93); subvector A2 having an AEL located at (18, 79); subvector A3 having an AEL located at (34, 65); subvector A4 having an AEL located at (50, 51); and subvector A5 having an AEL located at (66, 37). The AEL of each succeeding subvector element abuts the terminating video element of the preceeding subvector. Each of the A subvectors is a code 13 subvector. Note that the terminating subvector A5 has been truncated terminating at point (76, 28). Vector A in the encoded form is represented by a sequence of 5 subvector words, each word containing the coordinate of its address element left, the code for the subvector, and is truncated, the truncation length. It is seen, therefore, that the specification of A is completely independent of specification of vector B. Vector A can be accessed independently of vector B and may have different attributes than does vector B. The implementation of these properties in a display system will be discussed further in the context of the coded vector digital television display system.

Coded Vector Digital Television Display System

Figure 4:
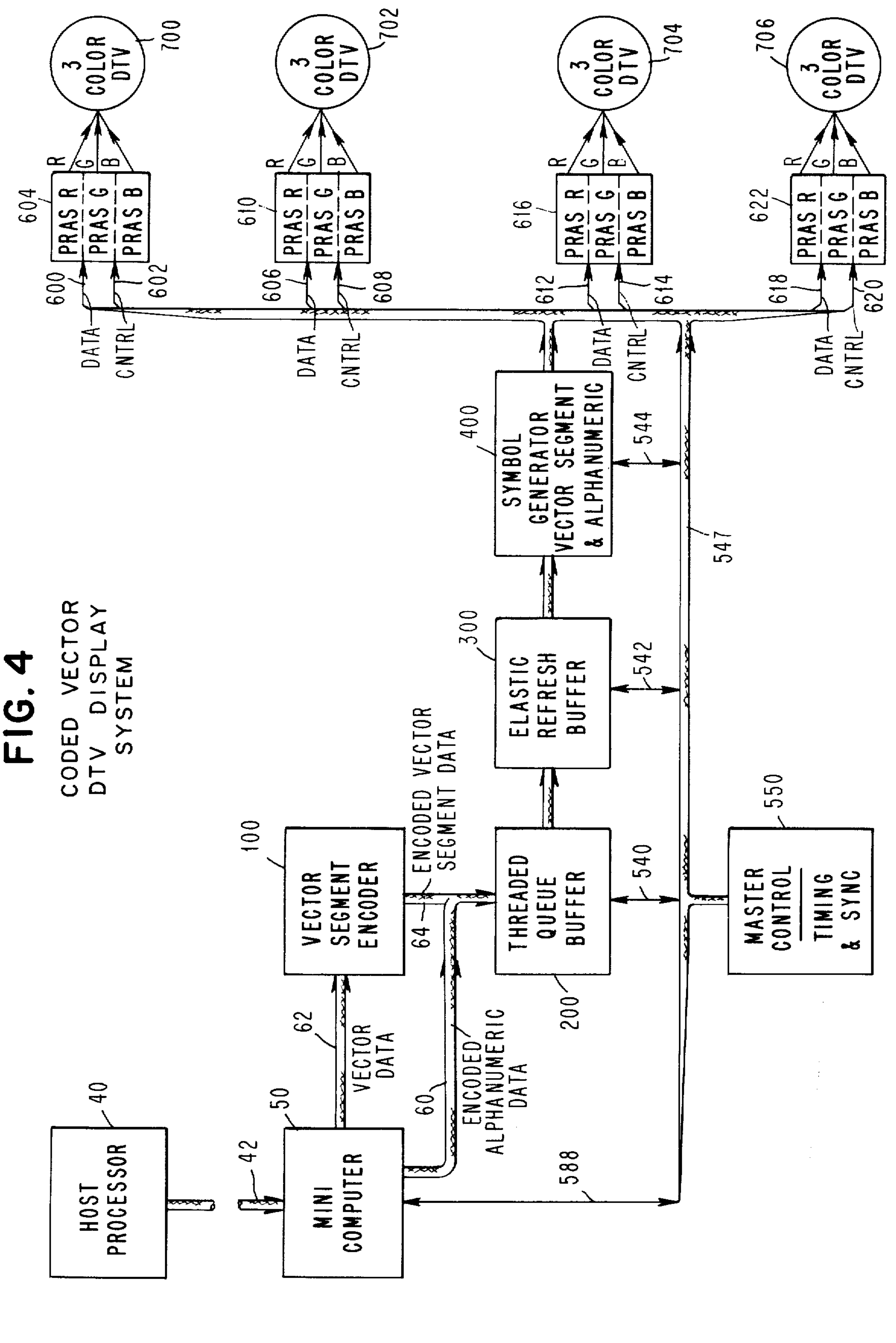
FIG. 4 depicts the coded vector digital television display system invention.

The coded vector digital television display system is depicted by the block diagram of FIG. 4. A minicomputer 50 provides the communication link between the host processor 40 and the display system over the channel 42. The minicomputer participates in vector generation by preprocessing vectors. It separates connected vectors and interchanges start and end points if necessary so that all vectors transmitted to the vector segment encoder 100, run down hill with the vector origin having a greater Y value than the vector head. The minicomputer also calculates the slopes of the vectors. Vectors transmitted to the vector segment encoder 100 are specified by the X and Y origin, their length, and their slope with respect to the X axis. The length specified is the greater of delta X or delta Y. Slope is defined as an unsigned number equal to the lesser of the absolute value of delta X over delta Y or the absolute value of delta Y over delta X. Two binary bits are used to specify one of four possible octants in which the vector will lie. This data is outputted by means of line 62 to the vector segment encoder 100.

The minicomputer also separates typewriter mode symbols, calculating the correct spacing, and specifies the alphanumeric symbols by the coordinates of the origin of their symbol box address element left as is shown in FIG. 2, and their symbol code. The alphanumeric data is outputted on line 60 directly into the threaded queue buffer 200. The control information for vectors and alphanumeric symbols is retained on line 60 and the minicomputer 50 need only send those control words which change between successive symbols. An additional word associated with each symbol specifies the channel number at which the item is to be displayed, a write/erase designation, and special attributes such as variations in color, intensity, or display fluctuations such as blink.

When data for a vector has been loaded in the vector segment encoder 100 it is enabled. The vector segment encoder 100 determines the starting coordinates (X, Y) for the origin AEL or AER of each vector segment, calculates its symbol code, and its length. All vector segments except the terminating vector segment at the head of the vector represented, have a maximum length of 16 units. The last segment will be shorter, truncated so as to terminate on the terminating point of the vector represented. As each segment is computed, it is loaded into the threaded queue buffer 200. Alphanumeric characters pass by the vector generator on line 60 and enter the threaded queue buffer 200 without further processing.

Figure 1:
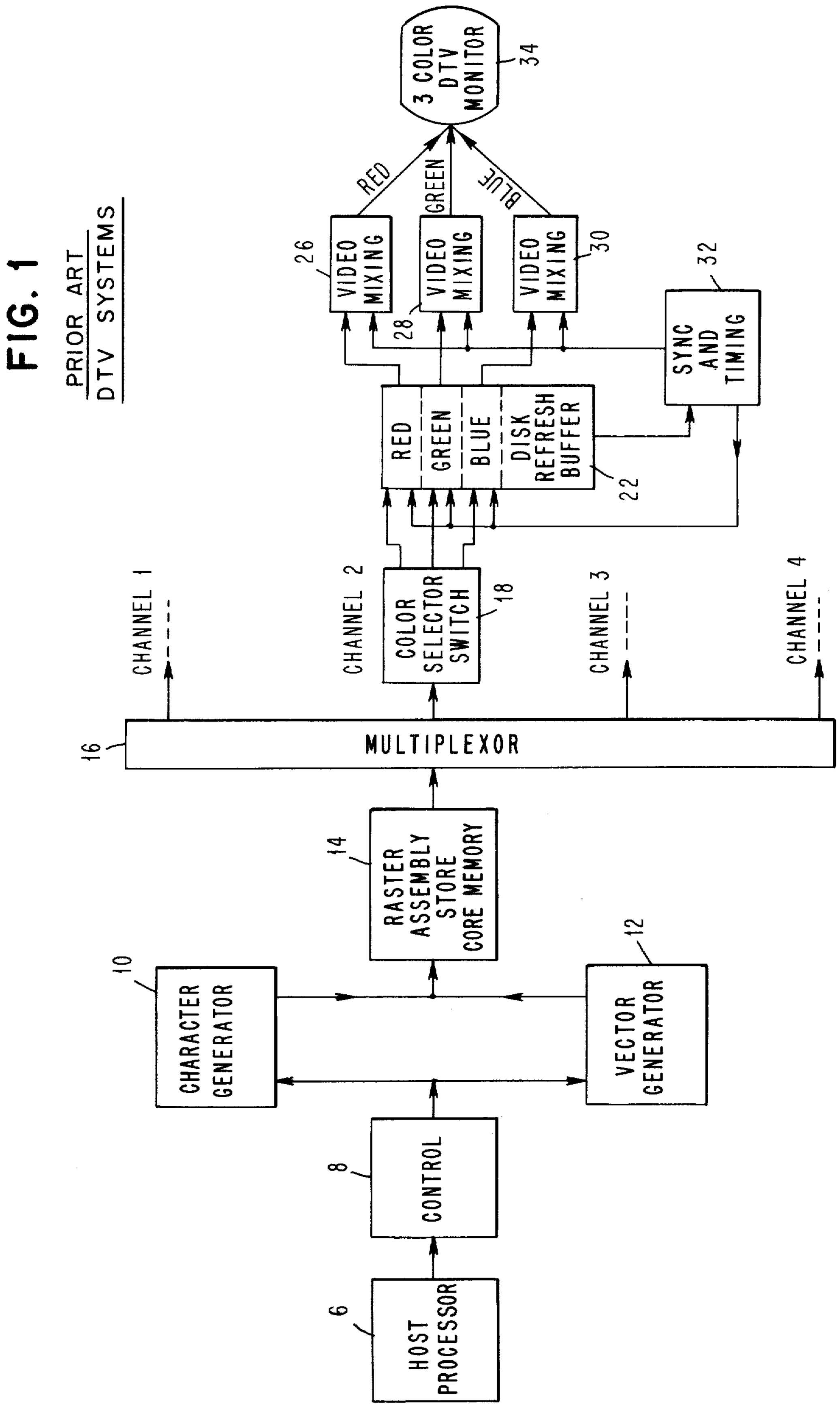
FIG. 1 PRIOR ART
FIG. 1 depicts an example of prior art digital television display systems employing the prior art explicit refresh technique.

The threaded queue buffer 200 is an 8K by 18 bit core memory which serves two functions. It receives symbols in a random order from the vector segment encoder and minicomputer and stores them until they can be loaded into the elastic refresh buffer 300. Secondly, the threaded queue buffer sorts the stored symbols by Y address of their AEL or AER origins. The sorting by the threaded queue buffer is an essential element of the invention permitting the system to be free from reliance on a large raster assembly storage 14 of the prior art systems shown in FIG. 1. When the symbols are read out of the threaded queue buffer 200, they are read out in clusters of symbols having the same Y address.

Sorting by the X coordinate is not performed and the X address is carried with each symbol. Storage requires one slot consisting of three words per symbol, the first of which is used by the sorting process. Sorting is accomplished by threaded lists, one list being provided for each Y address (corresponding to each visible TV line in the display). The index words, or pointers of these lists, are stored in the first registers of the memory; one register is used for each list. An additional list is used to keep track of all empty registers. Since this list is accessed each time a symbol is entered or removed, its pointer, the next empty register, is implemented as an active register. The queue is initialized by the minicomputer 50 such that all three word slots are threaded, each storing the address of another in its first word. The address of the first word in a string is stored in the "next empty register" and the end of the string is marked by a flag. Flags in all index words are reset indicating that their lists are empty, and flag in each slot indicating the first entry in a list are reset. Since the queue operates as a last in first out buffer, these mark the end of a list when reading out.

Data from the vector segment encoder 100 is loaded into the threaded queue buffer 200 in four memory cycles, with list threading being accomplished by address interchanging. As is shown in FIG. 5, the index register corresponding to the Y address is selected and read. Note that its list contains one slot, *n*, and that *n*'s end flag bit is set. The last empty register gives the address of an empty slot (*p*). The address of *p* is loaded into the index register and then slot *p* is read to obtain the address of the empty slot (*q*) to use the next time. When *p* is rewritten *n* replaces the *q* which has been stored there, completing the threading. The remaining two memory cycles are used to store data. FIG. 6 shows the threading of the list after this operation is completed. The index register now points to slot *p* which in turn points to slot *n*. The end flag once set is now moved, but is cleared when its contents is transferred to the refresh buffer.

Readout from the threaded queue buffer 200 is by Y location. The index register is read, its flag reset to empty, and the slots are read in the reverse order from which they were written. As each slot is read it becomes empty and its address is stored in the next empty register while the previous contents of the next empty register are stored in the slot. Thus, threading of empty slots is maintained as the queue fills and empties, despite the fact that the order of readout is different from the order of writing.

The elastic refresh buffer 300 contains the ordered lists of coded data with coloring and length attribute bits, X position, channel number, and control bits. It can be shared by a plurality of display channels. Y position is specified by a Y control word loaded into the refresh buffer before the data for each TV line. Y control words are shared by all channels. A core memory was selected as the most economical means for implementing the elastic refresh buffer. However, various forms of solid state memories are also suitable.

A continuous relocation organization is employed in the expandable refresh buffer. A form of split cycle is used in which data is read, the address changed, and the data rewritten in the new address. Read and write are both cyclic operations, the address being incremented after each operation, so that the location being written is always cleared by the previous read operation of that location. Insertions and deletions are made only during routine cyclic reading which is in step with the display operation. This method keeps all full registers in a compacted group or cluster which can be thought of as rotating since the memory wraps around. It is convenient to think of the operation of the expandable refresh buffer as that of a column of data which is read from and erased at the top and rewritten at the bottom. To delete data, the top is erased without rewriting and to add data, the new data is simply written at the bottom.

The symbol generator 400 can be inplemented in RAMS or ROMS or a combination, and can be shared by a plurality of displays.

Symbols are generated parallel by column and serial by row. The displays are interlaced and, therefore, each column is only 8 bits instead of 16, facilitating data routing. The symbol generator 400 is divided into four sections, each of which provides four columns per symbol, after which it passes the symbol code and the channel identification onto the next section. Data for a channel can have access to the first section as soon as it is free, provided the channel is not using any section. Throughput can be enhanced by loading the elastic refresh buffer 300 with maximum interspersion of channels.

Data from the symbol generator 400 and control information from the elastic refresh buffer are routed to the proper partial raster assembly storage (PRAS) 600–622, where a small band of the picture is assembled. A minimum PRAS could have a storage for 9 television lines, 8 of which would be used for data assembly while the 9th is read out. If this size PRAS were used all the symbols starting on the line after the one being read out would have to be assembled during that line time and data peaks could not be accommodated. For this reason, 16 TV lines of storage are provided as is shown in FIG. 7. Eight lines provide the basic assembly capacity, 6 lines provide averaging during peak loading, and 1 is for readout. The 16th is required since the TTL RAMS (used for their speed) have a nondistructive readout and each line must be clear during the TV line after it is read. Each PRAS consists of control logic and 16 identical storage units (SU). For color or gray level, additional sets of storage units are added. SUs with four 256 by 1 bit RAMS provide storage for 1024 elements with enough speed for 1125 line television operation.

FIG. 7 illustrates the PRAS operation. FIG. 7*a* shows a large I whose top bar is to appear on TV line 14 which has just been written into the PRAS. Since field A of the interlaced display is being written, there is no bottom bar, it being in field B. The I is loaded into the PRAS while field line 0 (also TV line 0) is being read. This is the earliest time at which line 0 would have been written since the TV line before (line-2) SU 6 was being cleared. If it were written one line earlier there would have been no place to put the bottom element. It could have been written as late as the time when field line 6 is being read. This allows averaging of data peaks over 7 field lines.

Figure 7A:
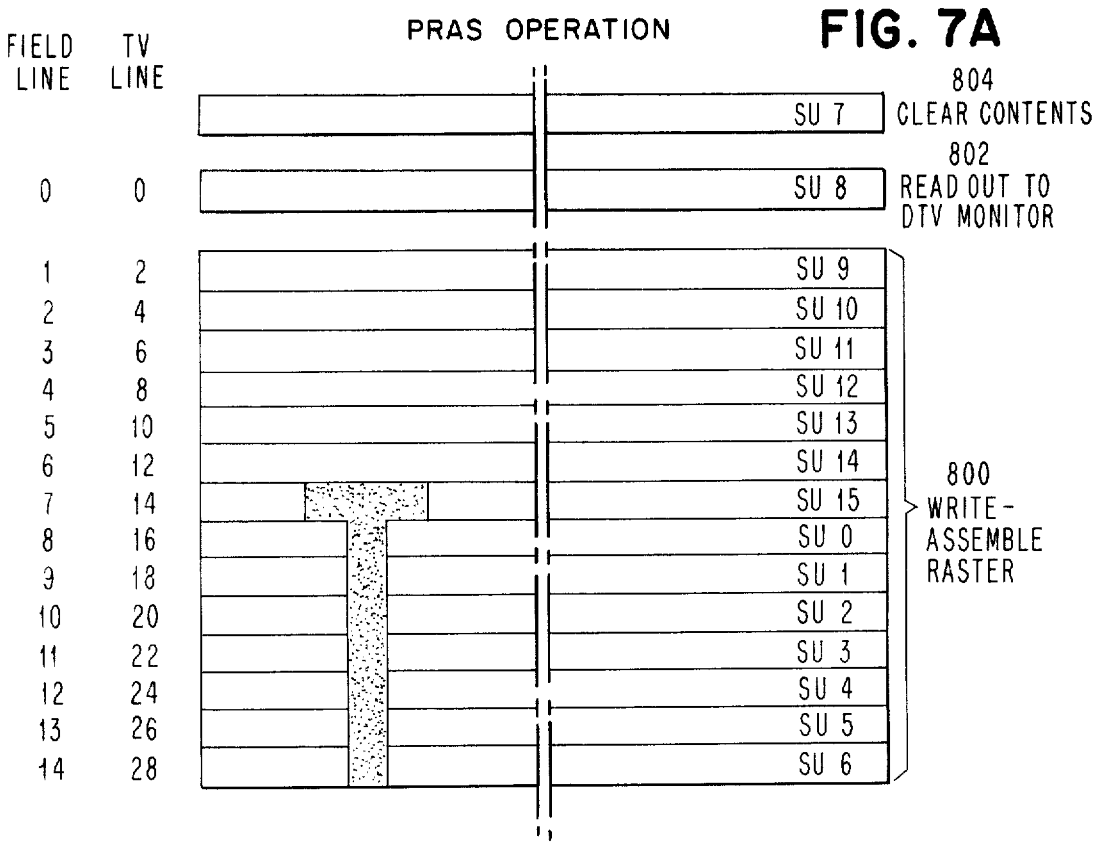
FIGS. 7A, 7B, 7C and 7D depict the operation of the partial raster assembly storage.
Figure 7B:
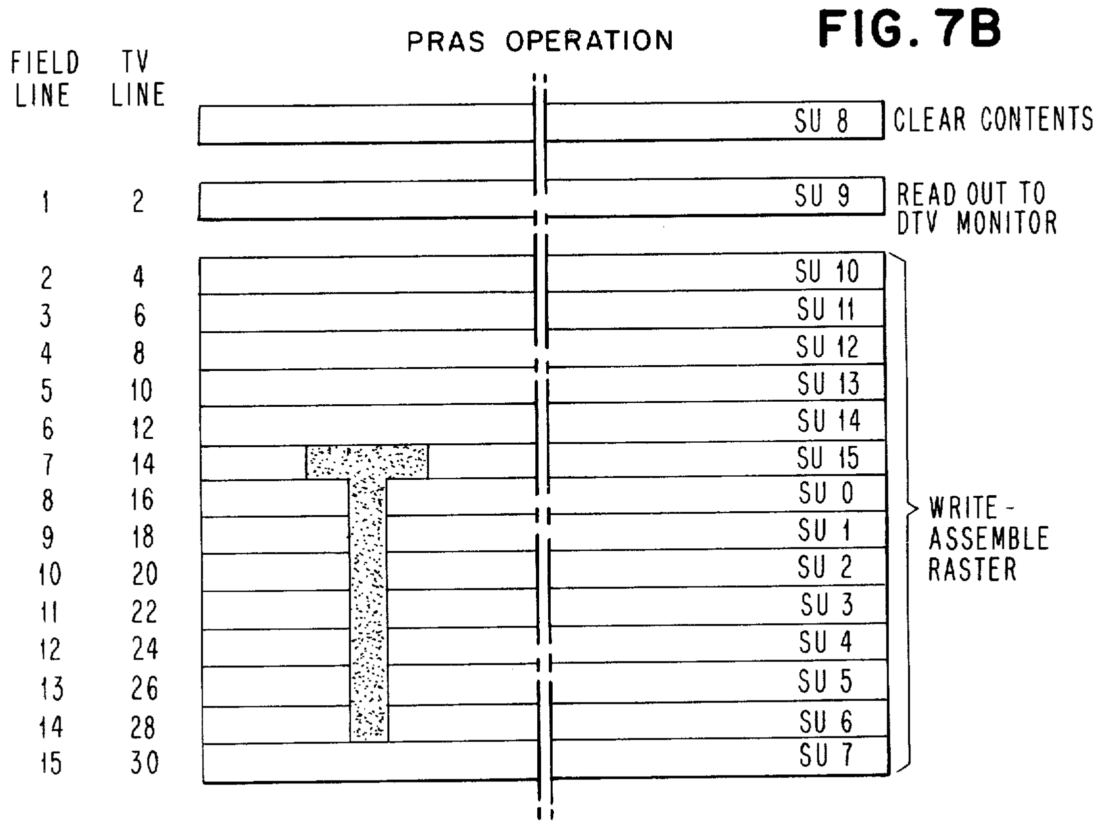
Figure 7C:
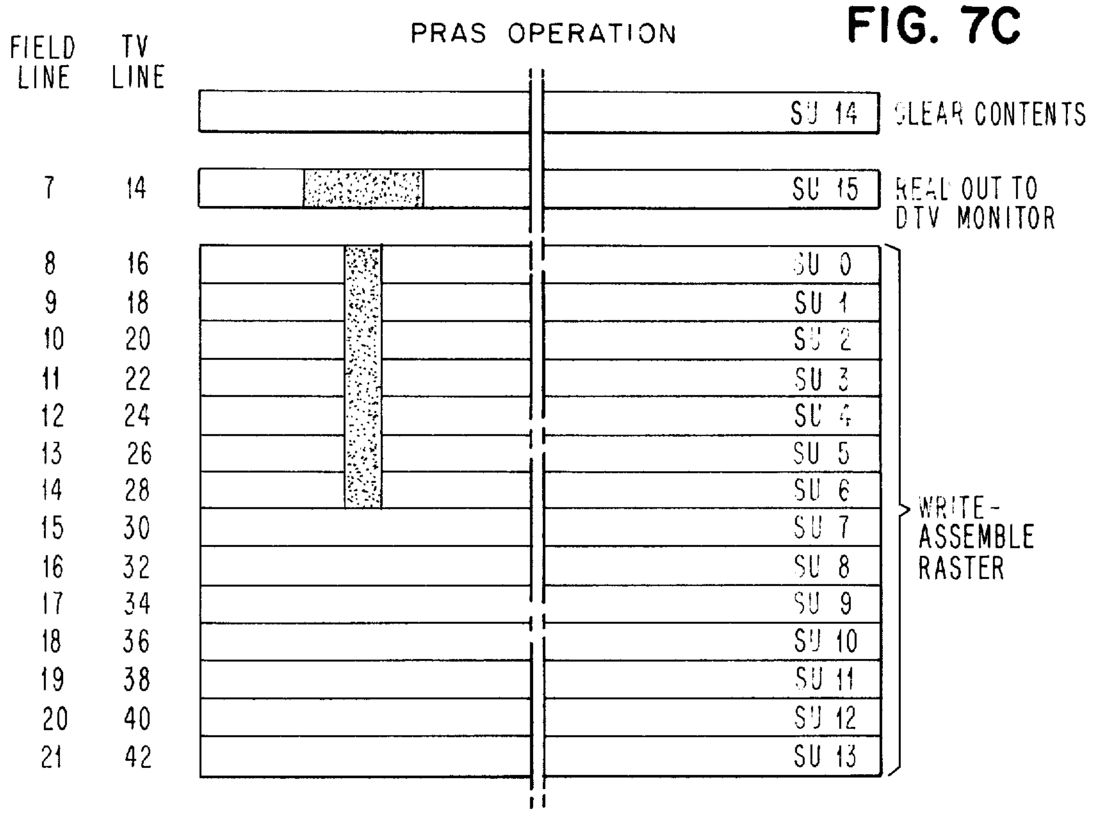
Figure 7D:
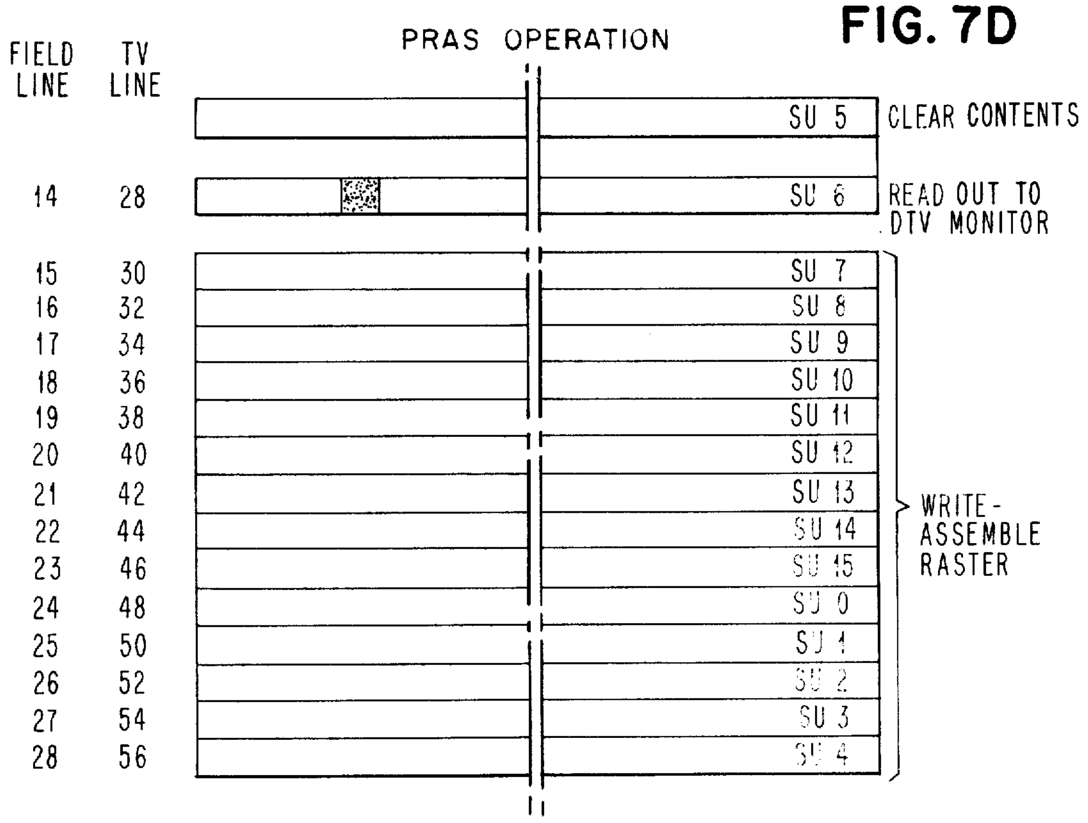

FIG. 7*b* shows the I one line later. Note that more data for TV line 14 can still be added by addressing SUs 15 through 6. FIG. 7*c* shows the top bar of the I being read and FIG. 7*d* shows the bottom element of the I being read with the rest of the I cleared.

In the implementation depicted in FIG. 4, a total of four channels can be refreshed. The displays are 1024 by 1024 raster units. The picture is equivalent to 1130 vectors and 570 characters (or 4800 characters with no vectors) on each of the four DTV displays. The memory used for all buffers, symbol store, and refresh is under 2,000,000 bits. To produce the equivalent display using the prior art explicit refresh would require over 5,000,000 bits.

Figure 8:
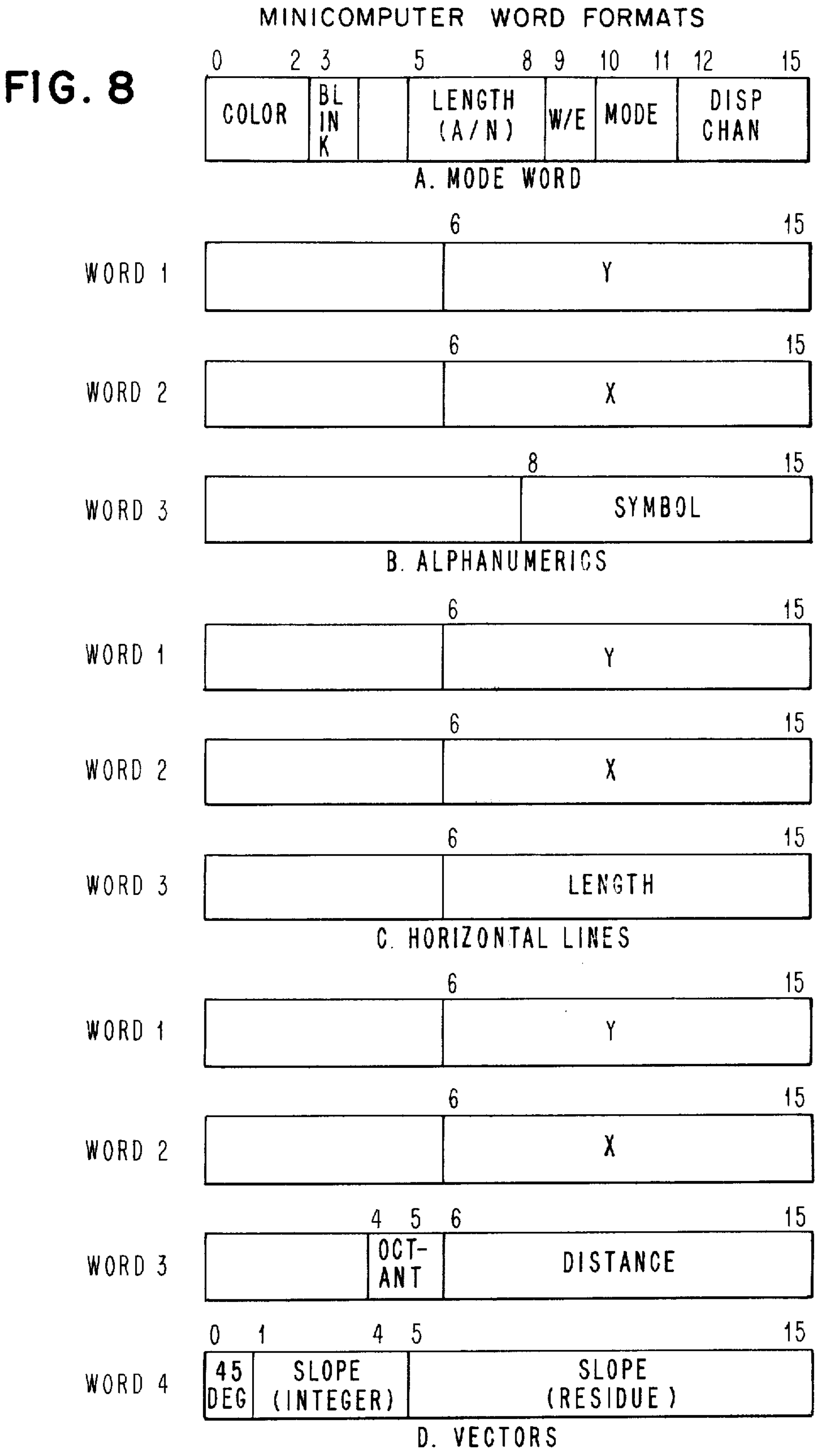
FIG. 8 depicts the minicomputer word formats.

Minicomputer: The minicomputer 50 has a 16 bit parallel data path which prepares two types of display messages for the system, alphanumeric which is outputted over line 60 and vector which is outputted over line 62. Alphanumerics are entered directly into the threaded queue buffer 200 and the minicomputer 50 does all the address computation and data formatting. Formats are shown in FIG. 8*b*. Vector preprocessing by the minicomputer 50 insures that delta Y is always negative (with the origin of the screen at the lower left) and separates connected vectors. Vectors in the formats of FIG. 8*d* are fed into the vector segment encoder 100, which performs the required calculations to decompose the vectors into the elemental 16 by 16 video bit subvectors shown in FIG. 2, which are in turn loaded in the encoded form, into the threaded queue buffer 200.

The minicomputer provides the starting X and Y coordinates for the origin of the vector. In addition, it provides the slope as minus delta Y over the absolute value of delta X for vectors in octants 1 and 4 of FIG. 9 and the inverse slope absolute value of delta X over minus delta Y for vectors in octants 2 and 3. It also provides the distance or number of points in the vector which is absolute value of delta X in octants 1 and 4 and minus delta Y in octants 2 and 3. Two bits are used to determine the octants. Horizontal lines are coded as is shown in FIG. 5*c*.

The minicomputer is not an essential element of the invention. The aforementioned functions executed thereby may be performed by dedicated logic or by the host processor 40.

Figure 11:
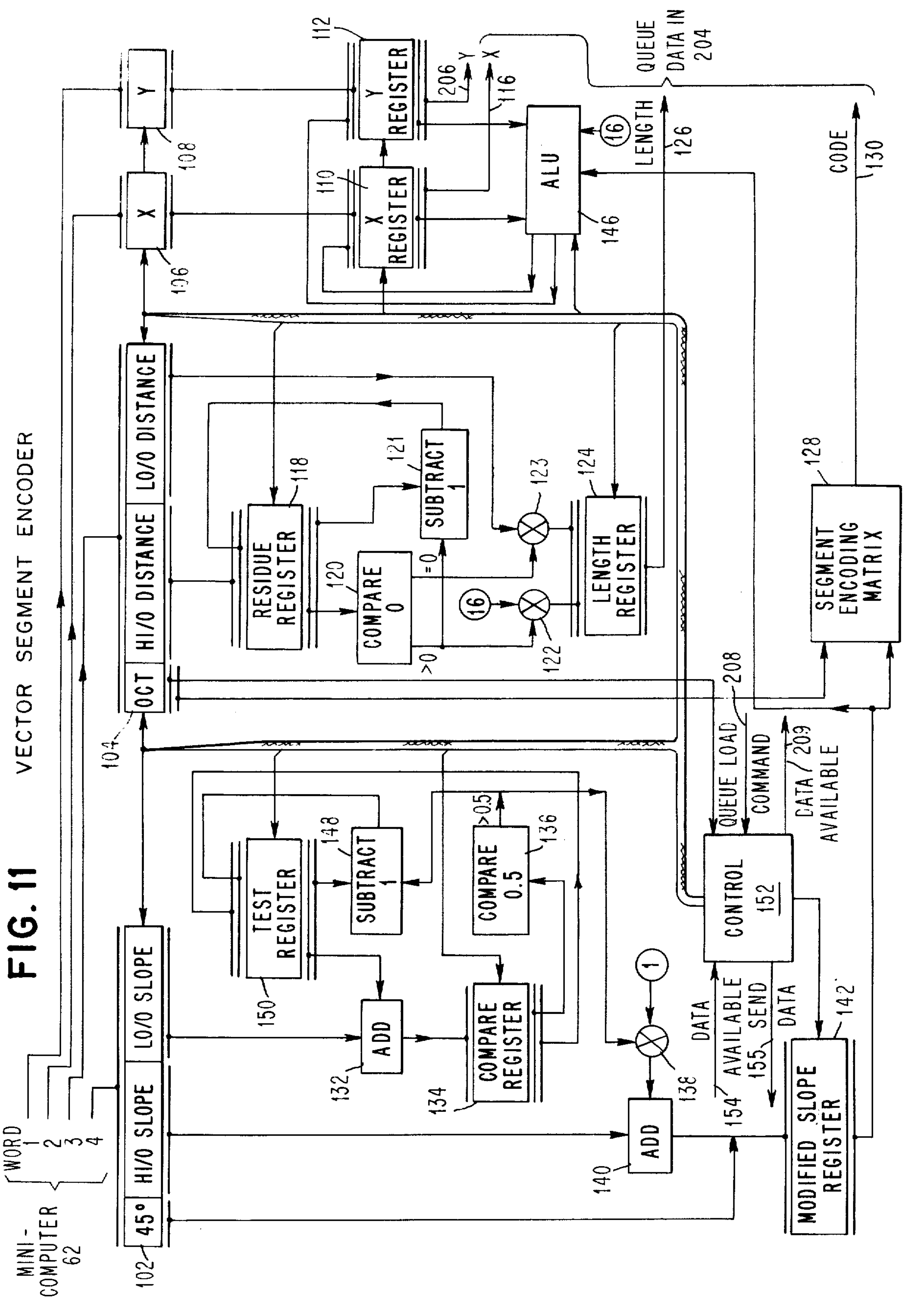
FIG. 11 depicts the vector segment encoder invention.

Vector Segment Encoder: The vector segment encoder 100 is shown in detail in FIG. 11. Four data words are transmitted to the vector segment encoder from the minicomputer 50 over the line 62. Words 1 and 2 are the Y and X coordinates of the origin of the vector and are stored in registers 108 and 106 of the vector segment encoder, respectively. Word 3 specifies the octant of the vector and its length, which is the larger of either delta X or delta Y and this data is stored in register 104 of the vector segment encoder of FIG. 11. Word 4 specifies the slope of the vector and is stored in register 102 of the vector segment encoder of FIG. 11.

The high order 6 bits of the length or distance field of word 3 determine the number of complete vector segments (each having a length of 16) into which the vector to be displayed is decomposed. Assuming that at least one vector segment is needed, the five high order bits of the slope are examined to determine which of two possible locations for the origin of the next vector segment are to be selected. To determine the starting point for the next vector segment, a running comparison must be made between the aggregate slope error of the subvectors already calculated and the slope of the vector which is to be represented. Cumulative errors in the slope of the subvectors must be corrected so that an accurate portrayal of the vector to be displayed can be made. This is accomplished as follows. During the initial set up, the 10 low order bits of the slope which are stored in register 102 are transferred to the test register 150. This value is called the residue of the slope and if it is less than 0.5, the integer value of the slope as indicated by the high order bits of the slope in register 102 remains unchanged. If the residue is greater than 0.5, the value of the slope indicated by the high order bits of register 102 are incremented by 1, which has the effect of displacing the start point of the next vector segment by one unit. Each time a subvector is generated, the 10 low order bits of the slope are accumulated with the previous contents of the test register so that the cumulative error in representing the vector by the sequence of subvectors is determined. After it is determined that the start point for a next subvector is to be displaced by one unit because the residue of the cumulative slope error is greater than 0.5, then the contents of the test register 150 is reduced by 1.

The coordinates of the origin of the vector X and Y stored in registers 106 and 108 are used as the address of the first vector segment's origin. After encoding the first vector segment, the value of X and Y are modified in registers 110 and 112 in accordance with the location of the origin of the next subvector and the 6 high order bits of the distance field stored in register 104 are decremented by 1. Complete vector segments are generated until the 6 high order run bits equal 0 as is determined by the contents of the length residue register 118. When the 6 high order bits the distance are 0, the 4 low order bits are examined. If they are not 0, one segment with a length less than 16 must be generated. This is done in the same way as complete segments but the length code is set to 1 less than the remaining distance, that is a length of 1 is represented as 0.

In operation, the X and Y coordinate value for the origin of a vector to be represented are stored in registers 106 and 108, and are initially represented in registers 110 and 112. The operation of the vector segment encoder is governed by the control 152 which determines that the distance residue register 118 has a value greater than 0 indicating that at least one more vector segment must be encoded. When this condition obtains, the coordinates of the origin of the vector segment to be encoded are present at the output lines 116 and 206. The distance residue register has a value greater than 1 and, therefore, compare block 120 enables the gate 122 causing the value 16 to be entered into the length register 124 and to be present on the output line 126. The low order value of the slope in register 102 is added to the residue of the slope error already accumulated in the test register 150. The sum is entered into the compare register 134 and compared with the value of 0.5 by the compare block 136. If the cumulative slope error value now in the compare register is greater than 0.5, the cumulative error in the slope is now large enough to justify a correction in the slope of the present subvector. This is accomplished by enabling the AND gate 138 which adds the value 1 to the high order slope stored in register 102. This sum is entered into the modified slope register 142. Since the correction has been made to compensate for the cumulative error in the slope, the value of the residue in the test register 150 is decremented by the value of one and is accomplished by the subtract block 158 subtracting 1 from the contents of the test register 150. If the contents of the compare register 134 have a magnitude less than 0.5, then the contents of the compare register is merely substituted for the present contents in test register 150, the gate 138 is not enabled, and the high order slope contained in register 102 is not modified but is directly entered into the modified slope register 142.

The contents of the modified slope register indicates on which one of the 16 terminating points in a generalized octant as shown in FIG. 10, the subvector will terminate. This data must be combined with the 4 value octant code in register 104 in order to specify which particular 1 out of 64 subvector codes of FIG. 2 is to represent the vector segment. This is accomplished by the vector segment encoding matrix 128 which is merely a 4 by 16 cross point switch which yields on the output line 130, the code for the vector segment specified by the modified slope register and the octant code. The four low order bits of the vector symbol code outputted by the matrix 128- are equal to the contents of the modified slope register when it has a value of between 0 and 7. The four low order bits of the vector symbol code outputted by the matrix 128 are equal to the contents of the modified slope register minus the quantity one, when the value of the contents lies between 8 and 16. The two high order bits of the vector symbol code outputted by the matrix 128, are equal to the octant code as specified in FIG. 9. Thus, if the modified slope is five (0101), the symbol code for the first octant is five (000101); for the second octant is 21 (010101); for the third octant is 53 (110101); and for the fourth octant is 37 (100101). If the modified slope is ten (1010), then 10 less 1 is 9 (1001) and the symbol code for first octant is 9 (001001); for the second octant is 25 (011001); for the third octant is 57 (111001); and for the fourth octant is 41 (101001). Output line 116 containing X coordinate for the origin of the present vector segment, output line 126 containing the length of the present vector segment and output line 130 containing the code for the present vector segment constitute input data line 204 for the queue. Output line 206 contains the Y value information for the present vector segment and is directed to the queue.

The coordinates for the origin of the next vector segment are generated as follows. The contents of the modified slope register for the present vector segment are directed to the arithmetic logic unit 146. The octant code for the vector to be represented which is stored in register 104 is furnished to the arithmetic logic unit 146 by means of the control 152. The numerical value of 16 is also furnished to the arithmetic logic unit. If the vector to be represented lies in the first octant, the value of X stored in register 110 is incremented in the ALU 146 by 16 and the value of Y stored in the Y register 112 is decremented in the ALU 146 by the contents of the modified slope register 142.

If the vector to be represented lies in the second octant, then the value of X in the X register 110 is incremented in the ALU 146 by the contents of the modified slope register 142 and the value of Y in the Y register 112 is decremented in the ALU 146 by the value of 16.

When the vector to be represented lies in the third octant, the value of X in the X register 110 is decremented in the ALU 146 by the contents of the modified slope register 142 and the value of Y in the Y register 112 is decremented in the ALU 146 by the value of 16.

When the vector to be represented lies in the fourth octant, the value of X in the X register 110 is decremented in the ALU 146 by 16 and the value of Y in the Y register 112 is decremented in the ALU 146 by the contents of the modified slope register 142.

The encoding of the next vector segment is completed by reading out the contents of the length register 124 onto line 126 and generating the code for the vector segment from the segment encoding matrix 128 out on output line 130. The vector segment encoding cycle continues under the control of control 152 until the distance residue register 118 contains value of 0. At that point the low order distance stored in register 104 is entered into the length register 124 and the last subvector representing the vector to be displayed is encoded with a truncated length so as to terminate the subvector on the terminating head of the vector to be represented. All outputs of the vector segment encoder are directed to the threaded queue buffer 200 of FIG. 12.

Figure 12:
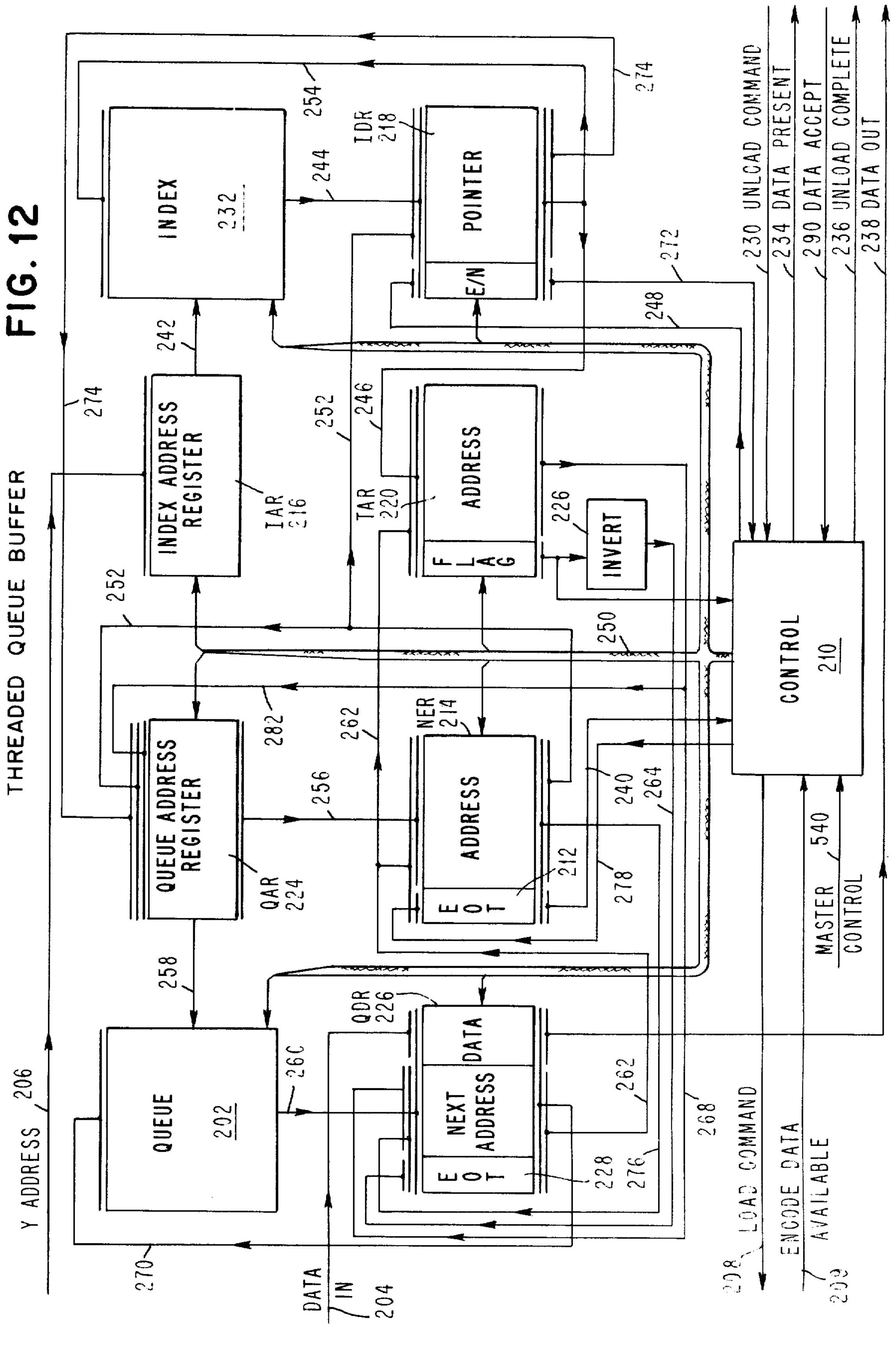
FIG. 12 depicts the threaded queue buffer invention.

The Threaded Queue Buffer: FIG. 12 shows a block diagram of the threaded queue buffer. To load new data into the queue 202, the data on input line 204 and the Y coordinate for the data on line 206 are set and a load command is given on line 208. The load command causes the control 210 to check over line 240 the status of the end of thread (EOT) bit 212 of the next empty register (NER) 214. If the status of the end of thread bit is a 1, the queue 202 is full and the load command on line 208 is kept pending until a queue location becomes available. Availability is indicated by a zero in the EOT bit of the NER 214.

If the EOT bit of the NER 214 is 0, the Y coordinate for the data is loaded on line 206 into the index address register (IAR) 216. The index address register accesses by means of line 242 the index pointer word in the index memory 232, corresponding to the Y coordinate. The index pointer word is read by means of line 244 into the index data register (IDR) 218 and the temporary address register (TAR) 220. The control 210 then causes by means of line 248, the E/NE bit 222 of the index data register 218, to be set to 1 and the address field of the next empty register (NER) 214 is loaded by means of line 252 into the pointer field of the index data register (IDR) 218. The contents of the IDR 218 are now stored by means of line 254 in the index 232 at the location maintained in the index address register (still corresponding to the Y coordinate). The setting of the empty/not empty (E/NE) bit to one indicates the presence of data in the queue memory 202.

The address field of the NER 214 is also written by means of line 252 into the queue address register (QAR) 224. The queue address register accesses the queue word corresponding to this address by means of line 258. The queue word accessed is read by means of line 260 into the queue data register (QDR) 226. The end of thread bit 212 and the next address field of the QDR 226 are also loaded into the next empty register NER 214. The end of thread bit 228 in the queue data register is now set by means of line 264 to 1 if the flag bit in the temporary data register TDR 220 is 0. The end of thread bit 228 will be set to 0 if the flag bit in the TDR 220 is 1. These inversions are accomplished by means of the invert block 226. The address field of the TDR 220 is loaded by means of line 268 into the next address field of the queue data register 226 and the data loaded into the data field of the QDR by means of line 204. The modified QDR word is now rewritten by means of line 270 into the queue register 202 at the location stored in the queue address register 224, thus completing the load cycle.

To unload data, the Y coordinate for the data desired, is set on the input lines 206 and the unload command given on line 230. The control 210 then causes by means of line 250 the Y coordinate on line 206 to be loaded into the index address register 216 and the corresponding index word to be read by means of line 244 into the index data register 218. If the empty/not empty bit 222 in the index data register 218 is a 0 as detected on line 272, there is no data in the queue 202 for the specified Y coordinate and the control 210 signals that the unload is completed on line 236. The next Y coordinate can then be processed in the unloading sequence.

If the empty/not empty bit 222 is a 1, the pointer field of the index data register 218 is loaded by means of line 274 into the queue address register 224 and the empty/not empty bit 222 of the index data register 218 is set by means of line 248 to a 0. The contents of the index data register 218 is then rewritten by means of line 254 into the index 232 at the location stored in the index address register 216.

The data in the queue locations specified by the queue address register 224 is now read by means of line 260 into the queue data register 226 and the control 210 gives the data present signal on line 234. The desired data is then read out of the queue data register on line 238. When data accepted is received on line 290, data present on line 234 is dropped. The end of thread bit 228 and the next address field of the queue data register 226 are also loaded by means of line 262 into the flag bit and the address field of the temporary address register 220. The contents of the next empty register 214 is then loaded by means of line 276 into the end of thread bit 228 and the next address field of the queue data register 226. The contents of the queue data register 226 is then written by means of line 270 into the queue 202 at the location stored on the queue address register 224. At the same time, the contents of the queue address register 224 is loaded by means of line 256 into the address field of the next empty register 214 and the end of thread bit 212 is reset to 0 by means of line 278. The flat bit of the temporary data register 220 is now tested by means of line 280 at the control 210. If it is one, there is no more for the Y coordinate and the unload complete signal is given on line 236. If the flag bit is a 0, the address field in the temporary data register 220 is loaded by means of line 282 into the queue address register 224 and the corresponding location in the queue register 202 is read by means of line 260 into the queue data register 226. The steps following the read step previously discussed are then repeated until there is no more data for the Y coordinate under consideration. An unload complete signal is then generated on line 236.

Figure 13:
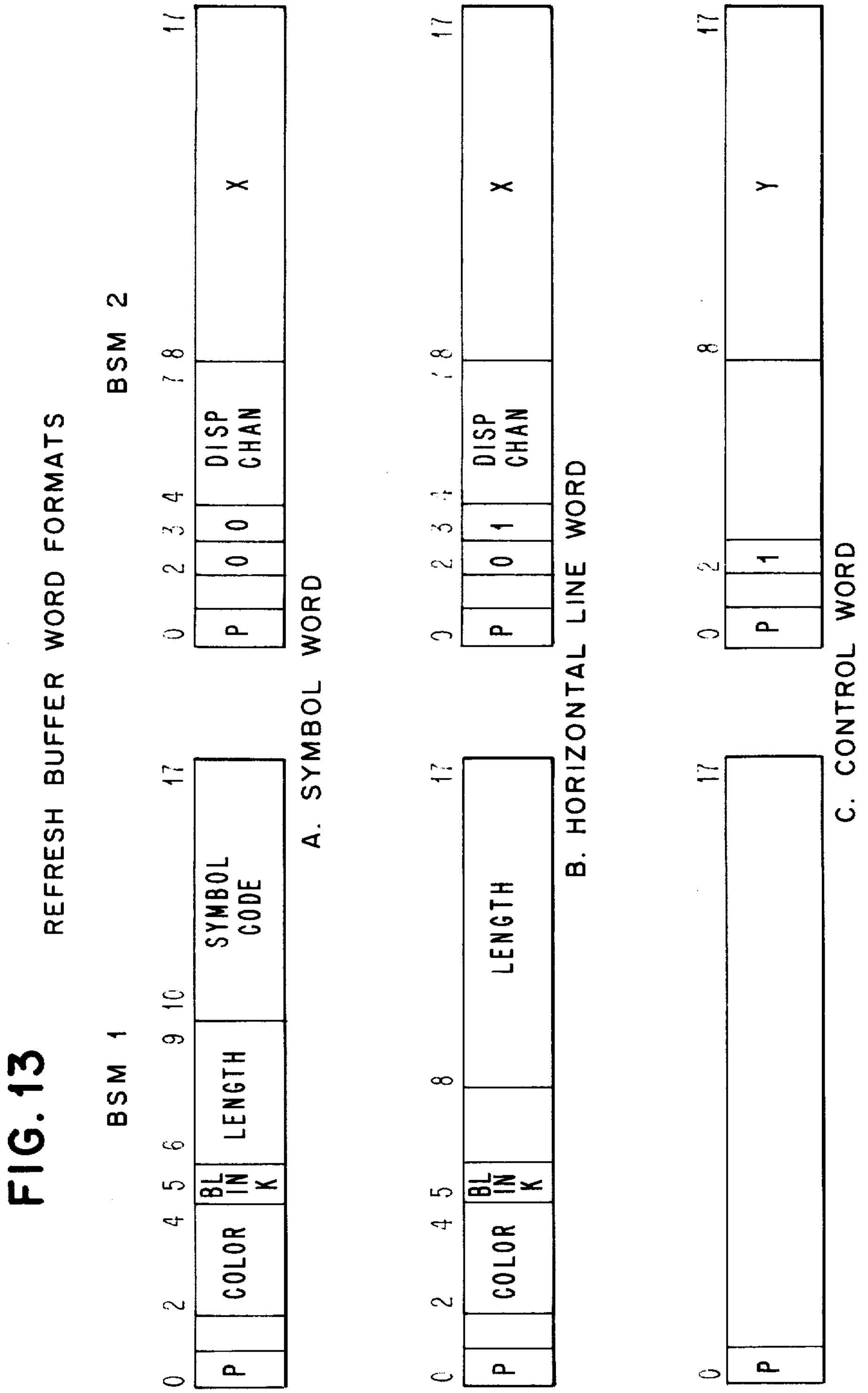
FIG. 13 depicts the refresh buffer word formats.

Elastic Refresh Buffer: The Elastic Refresh Buffer 400 is shown in detail in FIG. 14 as accepting data from the threaded queue buffer 300 and supplying data repetetively for display in the monitors 700. Word formats for the refresh buffer are shown in FIG. 13.

The elastic refresh buffer is intimatly associated with the partial raster assembly store 604 operation. The PRAS consists of 16 identical storage units (SU) as is shown in FIGS. *7a* through *7d.* Raster assembly takes place in the bottom 14 storage units 800. The 15th storage unit 802 is read out to the DTV monitor 700 and the 16th storage unit 804 is cleared of its contents, at which time the address of all storage units is incremented by one, the cleared storage unit assuming an address location at the bottom of the assembly of storage units shown available for raster assembly (write) 800. As each storage unit in the PRAS is read out and cleared, the TV line number is incremented by one in the PRAS control and is transmitted to the elastic refresh buffer over line 320. The TV line number is used to pace the refresh buffer and, when compared with the present data position in the refresh buffer, it is a measure of the slack time available for accepting new data from the threaded queue buffer 200.

Figure 14:
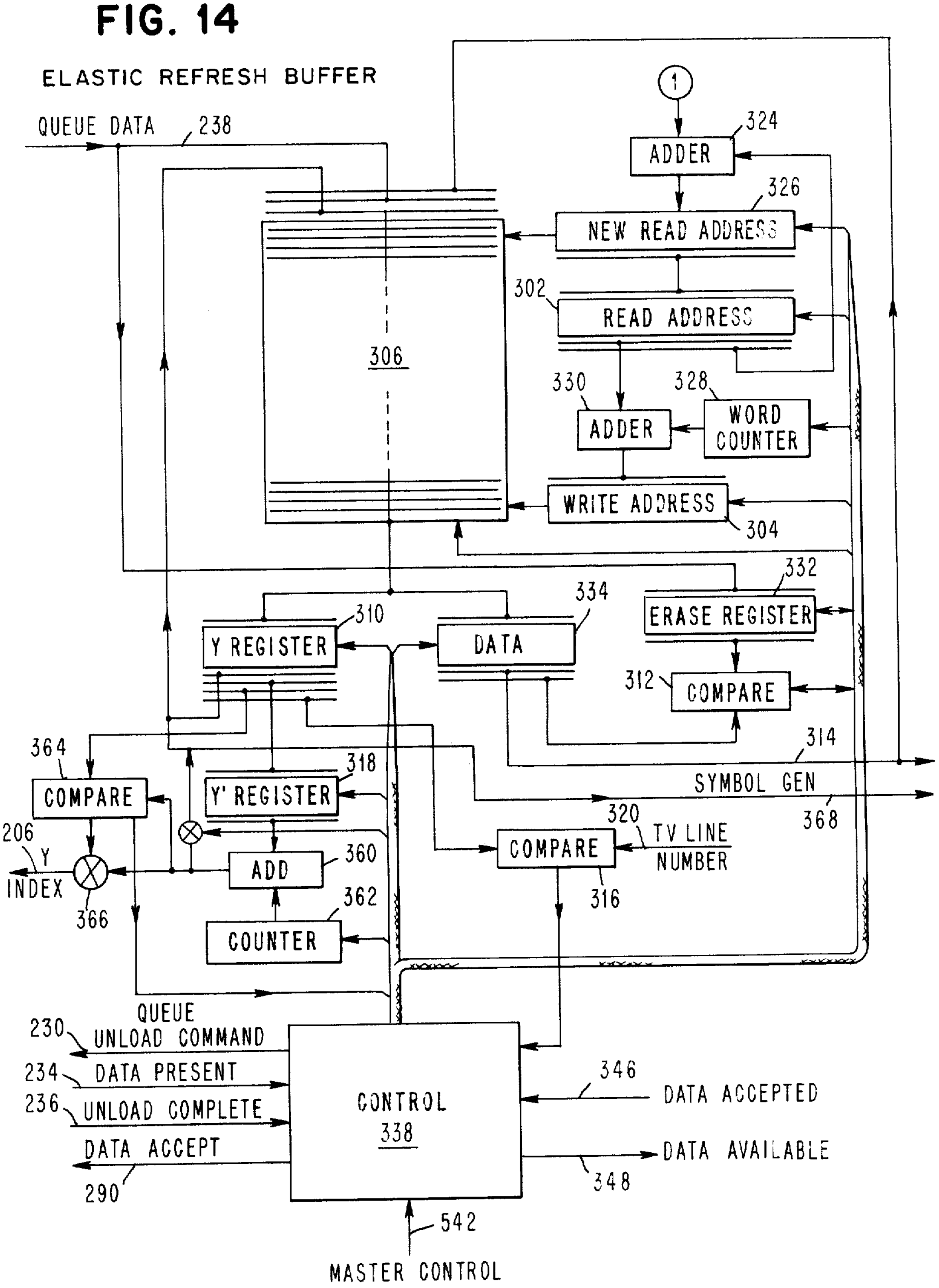
FIG. 14 depicts the elastic refresh buffer invention.

Elastic refresh buffer 300 is shown in detail in FIG. 14. Note that there are separate read and write address registers 302 and 304 respectively. A form of split cycle is used in which data is read from the memory 306, its address changed and the data rewritten in the memory 306 at a new address. Read and write are both cyclic, the address being incremented after each operation, so that the location being written has always been cleared by the previous read at that location. This does not preclude the use of a solid state memory with nondestructive read out. In that case the write operation is always positive since ones and zeros are written.

The elastic refresh buffer cyclically stores display data in a packed cluster which can be expanded as new data is loaded. The basic buffer configuration comprises the wrap around memory 306 of n words in length having an input line 238 for accepting display data from the threaded queue buffer 200, in serially adjacent locations in the memory 306. Connected to an address input of the memory 306 is the read address register 302 which cyclically accesses first locations at the top of the packed cluster of storage display data in the memory 306, for distructively reading out display data words from the memory 306 to the Y register 310 and the data register 334. Connected to an address input of the memory 306 is the write address register 304, for cyclically accessing second locations at the bottom of the packed cluster of stored display data in the memory 306, for rewriting the stored display data words at the bottom of the data cluster. A word counting means comprising the word counter 328 and the modulo *n* adder 330 has an input connected to the output of the read address register 302 and an output connected to an input of the write address register 304. The word counter 328 counts the number of display data words stored in the memory 306 as is detected by the control 338. The adder 330 adds the word count stored in word counter 328, modulo *n*, to the contents stored in the read address register 302. The adder 330 then loads the sum into the input of the write address register 304. By this means, display data being read from a location at the head of the data cluster in the memory 306 by means of the address stored in the read address register 302, will be rewritten at the tail of the data cluster at the address stored in the write address register 304. An address incrementing means comprising the modulo n adder 324 and the new address register 326 has an output connected to the input of the read address register 302 for loading the read address register with an address sequentially indexed, modulo n, prior to each memory access by the read address register 302. The read address stored in the read address register 302 is outputted to the modulo *n* adder 324 to which the value of 1 is added and the sum is transferred to the new address register 326. The new read address register 326 then outputs its contents to the read address register 302 in preparation for the next read access of the memory 306, under the control of control 338. A modulo n adder has the property that the arithmetic sum of the augend and the addend is divided by the quantity n and the remainder is outputted. When display data is neither being purged nor added to the data cluster stored in the memory 306, it is convenient to think of these cyclic operations as that of a column of data which is read from and erased at the top and rewritten at the bottom. To delete data, the top is erased without rewriting, and to add data, the new data is simply written at the bottom without reading from the top. To load a new display data word on line 238 into the memory 306, the control 338 halts the cyclic accessing by the read address register 302 while the write address register 304 continues to cyclically access the memory 306, each cycle being accompanied by an increment of unity in the word counter 328. A display data word is purged from the memory 306 by means of the control 338 halting the cyclic accessing of the memory 306 by the write address register 306 while continuing the cyclic accessing of the memory by the read address register 302, decrementing the word counter 328 by unity with each cycle.

As each location is read from the memory 306, bit 2 of the BSM 2 word is checked. If it is a one, the word is a control word which contains the Y address of the data words that follow. The control word is stored in the Y register 310. If the next word is not a control word, the control word is written at the location in memory 306 corresponding to the write address in register 304. Any control word followed immediately by another control word is not rewritten and is purged. The contents of the Y register 310 is continuously compared by means of comparitor 316 with the TV line number 320 presently being displayed. When the difference between the contents of the Y register and the field line is between 1 and 8, display data words are read from the memory 306 in the refresh buffer and are presented over output lines 314 and 368 to the symbol generator 400. When the symbol generator accepts the word it causes the X address to be transferred to the appropriate PRAS module 604 and the display data word is rewritten in the memory 306 at the location specified by the Y write address register 304. If the blink bit in field 5 of the BSM word 1 of the symbol word in FIG. 13*a* is set to 1 and the blink timer is in the "do not display" state, the data word is not presented to the character generator 400, but is immediately rewritten in the memory 306 at the location specified by the write address register 304.

It is possible for the refresh buffer 300 to contain a data peak which cannot be assembled in the PRAS module 604 in the available time. If this occurs and is not the result of lost time due to the threaded queue buffer 200 transferring data to the expandable refresh buffer 300, the accessed data is purged and a status indicator is set in the control 338. The condition is detected by an excess data latch in the control 338, which is set each time a control word is read from the memory 306 while the difference between the contents stored in the Y register 310 and the field line 320 equals 8. It is reset whenever an empty/not empty bit in the index memory 232 of the threaded queue buffer 200 is found to be Y. The over run condition exists if the difference between the contents stored in the Y register 310 and the field line 320 equal 0, while the excess data latch in the control 338 is set. The data is then purged until the next control word is read from the memory 306.

As the wrap around memory 306 in the expandable refresh buffer 300 is being read for display, it is also being loaded and purged of display data via the input line 238 from the threaded queue buffer 200. As each control word is read from the memory 306 and loaded into the Y register 310, the previous contents of the Y register 310 are transferred to the Y' register 318. Since the order of readout of the display data from the memory 306 is by ascending values of Y, the value of the contents stored in the Y' register 318 will be less than the value of the contents stored in the Y register 310. Thus, the index memory 232 of the threaded queue buffer 200 can be interrogated at Y index value locations from Y'+1 to Y during the period that the control word of value Y remains stored in the Y register 310, to determine if the queue memory 202 has display data stored therein corresponding to a value of Y index between Y'+1 and Y. The means for addressing the index memory 232 is the counter 362, the adder 360, the compare means 364 and the gate 366 of the elastic refresh buffer 300. The counter 362 is set to 0 and is indexed by unity by the control 338. The output of the counter is added by means of the adder 360 to the value of Y' stored in the Y' register 318. This sum is compared in the compare means 364 with the value of Y stored in the Y register 310 and if the sum is not greater than Y, the gate 366 is enabled and the sum, here referred to as Y Index, is outputted over line 206 to the index address register 216 of the threaded queue buffer 200. The corresponding location in the index memory 232 is accessed and the index data transferred to the index data register 218 where the state of the empty/not empty bit is determined over line 272 by means of the control 210. If the empty/not empty bit is a zero, no display data is stored in the queue memory 202 corresponding to the value of Y index and, therefore, the control 210 of the threaded queue buffer 200 transmits a unload complete signal over line 236 to the control 338 of the elastic refresh buffer 300. Control 338 then indexes the counter 362 so as to commence the interrogation of the next higher Y index location in the index register 232. If the empty/not empty bit in the index data register 218 of the threaded queue buffer 200 is a 1, this indicates that display data is stored in the queue memory 202 which corresponds to the Y Index value outputted on line 206 from the elastic refresh buffer 300. In this case, the threaded queue buffer control 210 sends a data present pulse over line 234 to the elastic refresh buffer control 338. The receipt of the first data present pulse over line 234 causes the queue unload command line 230 to turn on signalling the threaded queue buffer control 210 to commence unloading the queue memory 202. The first data input to the wrap around memory 306 is the control word shown in FIG. 13*c* which contains the Y Index value from adder 360, equal to the Y raster location where at the new display data will be located. As the first word of display data is outputted on line 238 from the threaded queue buffer, the second data present pulse is transmitted over line 234. The control 338 causes the cyclic reading operation of the read address register 302 to halt and increments the word counter 328 by unity while maintaining the cyclic operation of the write address register 304 for one cycle, thus loading the display data transmitted from the threaded queue buffer, into the bottom location of the data cluster in the memory 306, specified by the contents of the write address register 304. The elastic refresh buffer control 338 then sends a data accept pulse over line 290 to the control 210 of the threaded queue buffer indicating that the next display data word stored in the queue memory 202 may be accessed. When the end of the thread of the display data stored in the queue memory 202 corresponding to the Y index value, is read into the queue data register 226, the end of thread bit in the queue data word is equal to one and the threaded queue buffer control 210 detects this condition and transmits an unload complete signal over line 236 to the elastic refresh buffer control 338. The control 338 then resumes indexing the value of Y index and interrogating the index 232 until the compare means 364 determines that Y index is equal to the contents stored in the Y register 310 at which time, the control word stored in the wrap around memory 306 is read at the top of the data cluster at the location stored in the read address register 302 and normal cyclic readout for display.

An erase command option is provided in the symbol word prior to loading in the refresh buffer, with format as shown in Table 4. When the value of Y index on line 206 is equal to the value of Y stored in Y register 310, an erase command is detected in a symbol word inputted over line 238, and symbol word stored in the erase register 332. The display data stored in memory 306 immediately following the Y control word, is shifted into the data register 334 where its contents is compared with contents of the symbol word stored in the erase register 332. When a comparison is detected by means of the compare block 312, that symbol word is not rewritten into the memory 306, thereby purging it from the data cluster. In this case, the control 338 causes the read address to undergo its normal cyclic operation while suspending the cyclic operation of the write address register 304 and decrementing the word counter 328 by unit. If erase words are found before the Y index value on line 206 equals the contents of the Y register 310, they are errors and are discarded. The minicomputer 50 is informed when it reads status. Queue to refresh buffer transfers can cause the reading of the refresh buffer to lag the TV line number being displayed. This is detected by compare block 316 when the difference between Y register 310 and TV line number 320 equals 0. In this case, refresh buffer and queue operations continue but the PRAS module 604 is stopped until the refresh buffer catches up.

Figure 15:
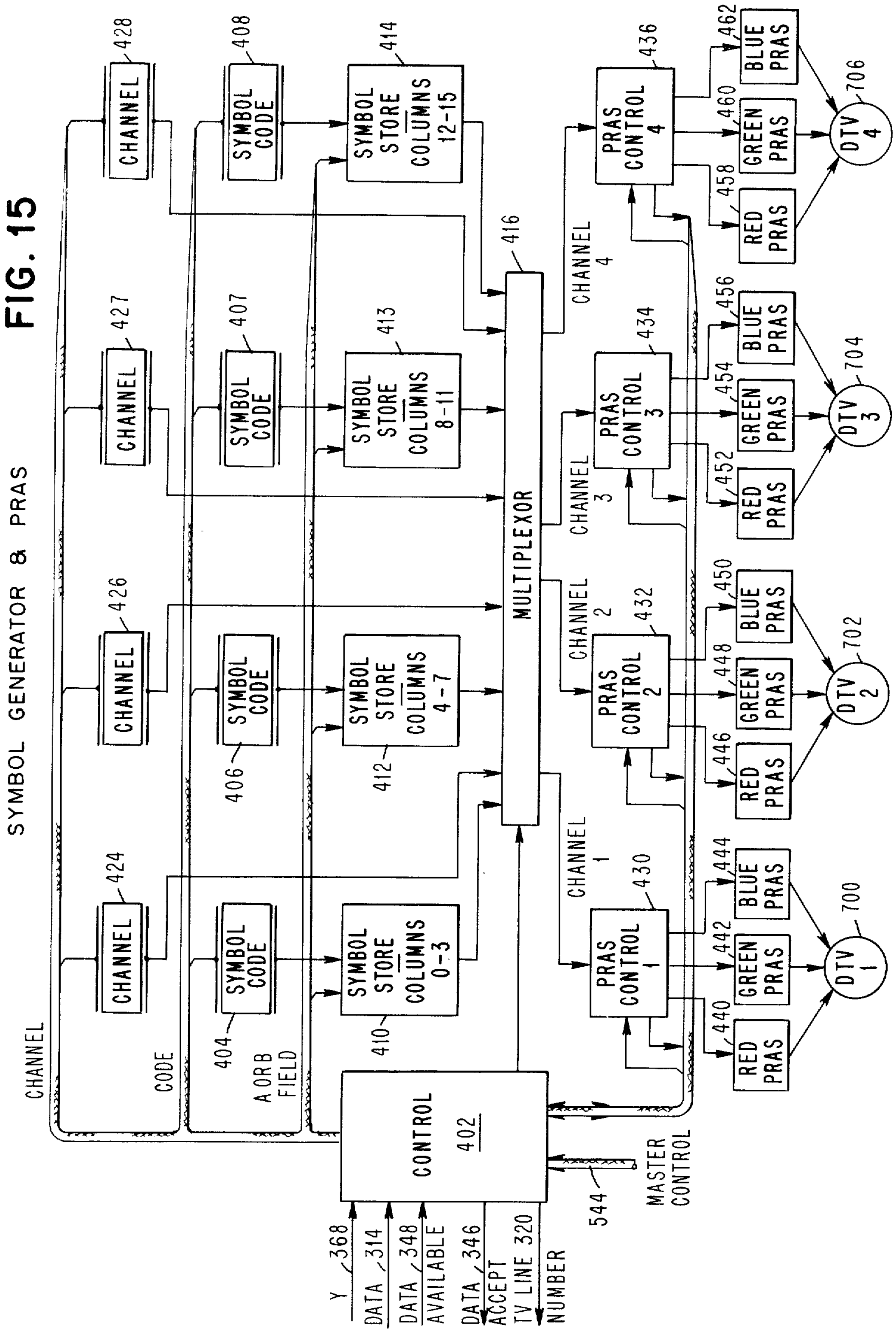
FIG. 15 depicts the symbol generator and partial raster assembly storage.

Symbol Generator: FIG. 15 shows a detailed illustration of the symbol generator. The symbol generator control 402 receives the Y value for the raster over line 368 which is essentially the control word of FIG. 13*c* and the display data over line 314 which is essentially the symbol word of FIG. 13*a*, from the elastic refresh buffer 300. Control 402 generates a data accept signal over line 346 when the raster location and display data are accepted from the refresh buffer. Symbol patterns are stored in four separate electrical alterable segment stores 410, 412, 413 and 414. Each contains 1024–16 bit words, and stores all the bits of four vertical columns for all 256 symbols of the symbol set of alphanumeric and vector segment characters. In other words, each symbol store contains 256 symbols times four columns per symbol times eight lines per field times two fields. Symbol code register 404, 406, 407 and 408 receive the symbol code from control 402 and in combination with the A or B field signal generates the A or B field configuration for the desired symbol as a pattern of raster illumination points. The display channel data is received in registers 424, 426, 427 and 428 which is passed to the multiplexer 416 along with the symbol pattern read out of the symbol stores. The multiplexer outputs the raster illumination pattern to the PRAS control 430, 432, 434 or 436 indicated by the channel number. The PRAS control sorts the data by color or other attributes and loads the eight rows of the symbol in the A or B field presently being displayed, into the raster assembly area 800 of the PRAS, as is shown in FIG. 7*a*.

Sixteen TV lines of storage are provided in each PRAS. Eight lines provide the basic assembly capability, six lines provide averaging during data peak loading, one is for readout and one is for clear. The clear stage is required since the TTL RAMS which are used for their speed, have a nondistructive readout and each line must be cleared during the TV line after it is read. Each PRAS consists of control logic and 16 identical storage units (SU). Each SU is a four by 256 bit ram which provides storage for 1024 elements with enough speed for a 1125 TV line operation. The data stored in the storage unit 802 of the PRAS shown in FIG. 7*a* is outputted to the digital television display monitor 700 as the video output signal.

The digital television display system disclosed employs coded alphanumeric and vector symbols which are encoded in a novel vector segment encoder, sorted in a novel threaded queue buffer, and assembled in a novel elastic refresh buffer enabling the storage of each vector so as to retain its attributes and identity therein and thus enable the display of several channels or colors or intensities of other attributes from a single storage module.

OPERATION OF THE DIGITAL TELEVISION DISPLAY SYSTEM

The operation of the digital television display system employing coded vector graphics will be described with reference to the display of the vector and alphanumeric data shown in FIG. 16 and Tables 1, 2 and 3. Assume for this example that display data is presently stored and being displayed at lines 100 and 195, and that we wish to enter new data into the elastic refresh buffer for display.

Figure 16:
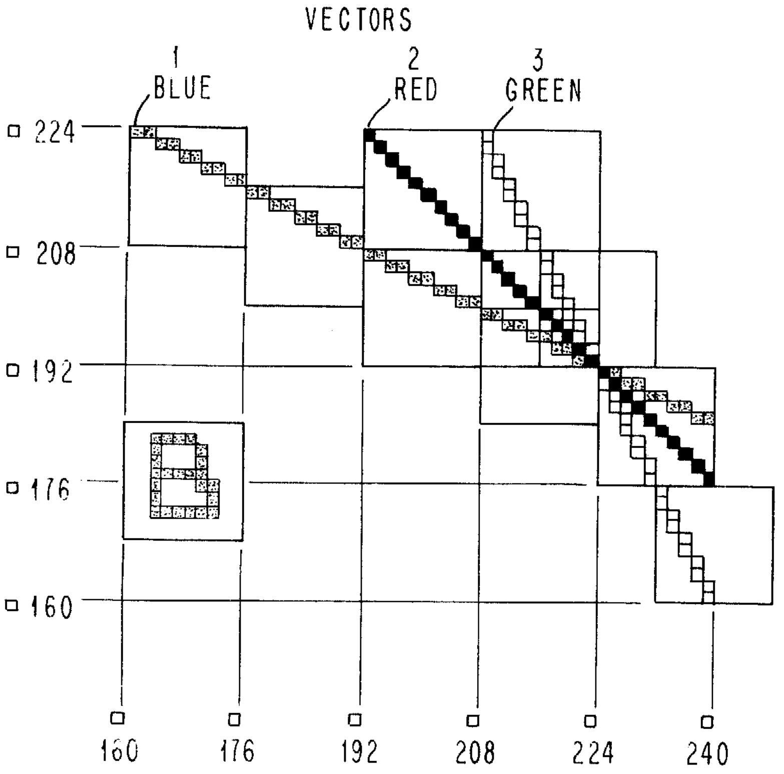
FIG. 16 depicts a sample display generated by the coded vector digital television system.

FIG. 16 shows the new information to be entered consisting of vectors 1, 2 and 3 and the alphanumeric symbol B as they would be displayed by the coded vector digital television display system. The data entered into the minicomputer 50 by the host processor 40 for the vectors to be represented are the origin and terminating points for each vector, namely: vector 1 (X1, Y1) = (161, 224) and (X2, Y2) = (240, 184 and 176/256); vector 2 is (X1, Y1) = (193, 224) and (X2, Y2) = (240, 177); and vector 3 (X1, Y1) = (209, 224) and (X2, Y2) = (239, 161). The alphanumeric symbol B has an address element left coordinate of (X, Y) = (161, 184). This data is sequentially processed by the minicomputer 50 along with information received from the host processor with respect to the color, blink, length, write or erase commands, mode, and channel display characteristics of each particular symbol or vector. Mode words in the format shown in FIG. 8*a* are outputted on line 60 from the minicomputer. Alphanumeric data having the format shown in FIG. 8*b* is outputted along line 60 from the minicomputer. Vector data having the format shown in FIG. 8*b* is outputted along line 62 from the minicomputer 50 to the vector segment encoder 100. The data outputted by the minicomputer for vector number 1 is shown in Table 1, namely a vector slope of 8 and 1/16, and octant of 1 and a distance of 5 with an origin of (X, Y) = (161, 224). The data outputted form the minicomputer 50 to the vector segment encoder 100 for vector number 2 is shown in Table 2 and is: a vector slope of 16, an octant of 1, a distance of 3, and an origin (X, Y) = (193, 224). The data outputted from the minicomputer 50 to the vector segment encoder 100 for vector number 3 is shown in Table 3 and is: a vector slope of 7¾, an octant of 2, a distance of 4, and an origin of (X, Y) = (209, 224). After the vector data preprocessing of the minicomputer has been completed, a data available signal appears on line 154 into the control 152 of the vector segment encoder indicating that data for a vector to be represented is available from the minicomputer. If the vector segment encoder 100 is not otherwise occupied, the control 152 sends a data pulse 155 to the minicomputer at which time data for the vector to be represented is transferred over line 62. Word 1 of FIG. 8*d* is inserted into the Y register 108, word 2 of FIG. 8*d* is inserted into the X register 106, word 3 containing the octant and distance information is inserted into register 104, and word 4 containing the slope information is inserted into register 102 of the vector segment encoder of FIG. 11.

At this time the decomposition of the vector to be represented into the connected sequence of vector segments and the encoding thereof into vector segment words which wil be outputted to the queue memory 202 of the threaded queue buffer commences. As each segment is generated a data available signal is outputted from control 152 of the vector segment encoder over line 209 to the threaded queue buffer control 210 of FIG. 12. If the threaded queue buffer is not otherwise occupied, its control 210 signals a load command over line 208 to the control 152 of the vector segment encoder. Table 1 shows the status of the data stored in the test register 150, the compare register 134, the modified slope adder 140 and the modified slope register 142 for each vector segment calculated for vector number 1. Also shown is the symbol set code for each vector segment calculated, the coordinates for the address elements left for each vector segment calculated and the corresponding coordinates of the true vector to be represented to enable the comparison of the calculated location of the vector segments and the actual location of the true vector.

For vector number 1 the first vector segment calculated has coordinates for its address element left origin of (X, Y) = (161, 224) and appears on the output lines 116 and 206 respectively. The length residue register 118 contains the quanity 5 and thus the comparitor 120, determining that this value is greater than 0, causes the length register 124 to output a length of 16 on the output line 126. The test register 150 has not accumulated any slope error at this time and contains a value of 0. This value is added to the low order slope stored in register 102 and is entered into the compare register 134 as quantity 1/16. The compare block 136 determines that this quantity is less than 0.5 and, therefore, the gate 128 is not actuated and the modified slope adder merely transfers the contents of the high order slope of the register 102 and enters the value 8 into the modified slope register 142. The value of 9 outputted from the modified slope register into the segment encoding matrix 128, when reduced by one and combined with the octant value of 00 as is stored in the octant location of register 104 yields a symbol code of 7 to represent the vector segment calculated, which is outputted on line 130. The Y address is entered into the index address register 216 of the threaded queue buffer and the X coordinate on line 116, the vector segment length on line 126 and the symbol code on line 130 are entered via line 204 into the data portion of the queue data register 226 of the threaded queue buffer of FIG. 12. The vector segment encoder control 152 now actuates the arithmetic logic unit 146 which accepts the octant code value of 00, stored in register 104, as its key for modifying the values of X and Y stored in registers 110 and 112 respectively. The value of X is incremented by 16 and replaced in the X register 110. The value of Y is decremented by the contents stored in the modified slope register, namely the quantity 8, and is replaced in the Y register 112. The contents of the X and Y registers 110 and 112 now contain the values 177 and 216 respectively, as the coordinates for the address-element-left origin for the next vector segment to be generated. The control 152 now causes the length residue comparitor 120 to determine that the value of the length residue now stored in the residue register 118, which is the quantity 4, is greater than the value 0. Thus, determining the status, the comparitor actuates gate 122 causing the length register 124 to output the value 16 on the output line 126 as the length of the next vector segment to be generated. The test register 150 now contains the value 1/16 which is added by means of the slope adder 132 to the contents of the low order slope in register 102 as the sum entered into the compare register 134. This quantity 2/16 is determined by the comparitor 136 to be less than the value of 0.5 and, therefore, the gate 128 is not actuated. The modified slope adder 140 merely transfers the contents of the high order slope in the register 102 into the modified slope register 142 as the value 8. Once again the contents of the modified slope register 142 and the contents of the octant portion of the register 104 are combined in the segment encoding matrix 128 to yield a symbol code 7 over the output line 130. Thus, the data for the second vector segment is available on output lines 206, 116, 126 and 130 to be inputted into the threaded queue buffer 200. The operation of the vector segment encoder continues until the quantity stored in the residue register 118 equal 0 at which time the control 152 determines whether the low order distance field of the register 104 contains a fractional length. If in fact it does, this quantity is inputted into the length register 124 as the length of the terminating vector segment. In the case of vector number 1, nothing is stored in the low order distance field and, therefore, vector number 1 has been completely decomposed into a sequence of 5 vector segments each encoded as a vector symbol code 7 and outputted to the threaded queue buffer 200 of FIG. 12. The master control 550 of FIG. 4 synchronizes the operation of the minicomputer 50, the vector segment encoder 100, and the threaded queue buffer 200 so that each coded vector segment word generated by the vector segment encoder 100 and outputted on line 64 is merged with a mode word shown in FIG. 8*a* which incorporates the characteristics of the vector represented by the vector segment, so that the combined mode word and encoded vector segment word inputted to the data portion of the queue data register 226 over line 204 has the format shown under the "data" heading of the message queue diagram of Table 4.

Table 4 shows the status of the index memory and the queue memory of the threaded queue buffer 200 prior to the entry of any data from the vector segment encoder. Note that the empty locations are threaded together and that the next empty register NER points to a queue location 1 as the head of the thread. Queue location 16 contains a 1 bit in the end of thread field indicating that it is the end of the thread of empty locations in the queue memory. Nine raster line values are shown under the heading "Y coordinate" of the index memory. The empty/not empty field at each of the Y coordinate values, contains a 0 bit indicating that there is no display data presently stored in the queue memory 202 corresponding to that raster line location.

Table 5*a* shows the operation of the index memory 232 and the queue memory 202 is loading the first subvector of vector 1 from the vector segment encoder. The Y address value of 224 is inputted over the Y address line 206 and stored in the index address register 216 for accessing the Y location value of 224 in the index memory 232. The contents of the empty/not empty field and the pointer field in the location corresponding to a Y value of 224 is outputted to the index data register 218 and a temporary address register 220. The control 210 then causes by means of line 248, the E/NE bit 222 of the index data register 218 to be set to 1 and the contents of the address field of the next empty register 214 is loaded by means of line 252 into the pointer field of the index data register 218. The contents of the index data register are now stored by means of line 254 in the index memory 232 at the location maintained in the index address register still corresponding to the Y coordinate value of 224. The pointer field thus stored points to the queue location number 1 which will be the end of the thread of any data to be entered into the queue corresponding to the Y value of 224, and will in fact be the location for the display data corresponding to the first vector segment of vector 1. The setting of the E/NE bit 21 indicates that the corresponding location in the queue register is not empty. The address field of the NER 214 containing the quantity 1 is also written in the queue address register 224. The queue address register accesses the queue word corresponding to the pointer word by means of line 258. The queue word accessed is read by means of line 260 into the queue data register 226. The end of thread bit 212 and the next address field of the queue data register 226 are also loaded into the next empty register NER 214. The end of thread bit 228 in the queue data register is now set by means of line 264 to 1 if the flag bit in the temporary address register TAR is a 0. This shows that the contents which will be loaded into the first queue location in the queue memory 202 will be the end of the data thread. The address field of the temporary address register 220 is loaded by means of line 268 into the next address field of the queue data register 226 and the data loaded into the data field of the queue data register by means of line 204. The modified queue data register word is now rewritten by means of line 270 into the queue register 202 at the location stored in the queue address register 224 thus completing the load cycle. The status of the contents of the index memory 234 and the queue memory 202 are shown in Table 5*a*.

Table 5b shows the status of the queue memory 202 after the display data for the second vector segment for vector number 1 has been loaded. Note that both queue location 1 and queue location 2 are the ends of separate threads, the contents of queue location 1 being pointed by the queue location pointer field at Y coordinate value 224 in the index memory 232 and the contents of queue location 2 being pointed to by the queue location pointer at Y coordinate value 216 in the index memory 232.

Table 5*c* shows the status of the queue memory 202 in the index memory 232 after vector 1 has been completely loaded into the queue with the first vector segment in queue location 1, the second vector segment in queue location 2, the third vector segment in queue location 3, the fourth vector segment in queue location 4, and the fifth vector segment in queue location 5. The display data in each of the queue locations 1 through 5 is each indicated as at the end of a separate data thread corresponding to the five separate raster line positions for the origin of the address elemtn left of each vector segment as is shown in FIG. 16. Note that the thread of empty locations has its head at queue location 6, as is specified in the NER of Table 5*c*.

After vector number 1 has been completely decomposed and loaded into the threaded queue buffer 200, the minicomputer 50, having the preprocessed data for the vector number 2, signals that data is available over line 154 to the control 152 of the vector segment encoder. The vector segment encoder issues a send data signal over line 155 and registers 102, 104, 106 and 108 of the vector segment encoder are loaded by means of line 62 from the minicomputer. Table 2 shows the status of the test register 150, the compare register 134, the modified slope adder 140, the modified slope register 142 and the output of the segment encoding matrix 128 for each of the three vector segments into which vector number 2 is decomposed. A data available signal is generated on line 209 by the vector segment encoder control 152 signalling the threaded queue buffer control 210 as each segment becomes available. When the control 210 is ready it returns a load command signal on line 208. The loading of the first subvector of vector 2 into the queue memory 202 is shown in FIG. 6*a*. When the Y raster value of 224 is entered into the index address register 216, and to the corresponding index pointer word stored in the index memory 232 is accessed and read into the IDR 218, the contents of the next empty register which is the location of the present head of the thread of the empty location in the queue memory, is stored in the pointer field of the IDR. The pointer field of the IDR now contains the value 6 which will be the location of the head of the data thread for Y = 224. As the data word is being assembled in the queue data register for storage in the queue memory 202, the address field of the TAR, which contains the value 1 as the old head of the data thread for Y = 224, is substituted in the queue data word of the QDR. Thus, the Y coordinate value 224 in the index memory 232 contains a queue location pointer having the value 6 pointing to the new head of the data thread for Y = 224 and the contents of the queue word at location 6 and the queue contains the value 1 which is the location of the next display data word in the data thread for Y = 224. Note that the thread of empty location has its new head located at queue location 7.

Table 6*b* shows the status of the queue memory 202 and the index memory 232 after vector number 2 has been completely loaded. There are now 3 threads of data and 1 thread of empty locations in the queue memory. The data thread for Y = 224 has its head at location 6 and its end at location 1. The data thread for Y = 208 has its head at location 7 and its end at location 3. The data thread for Y = 192 has its head at location 8 8 and its end at location 5. The thread of empty locations has its head at location 9 and its end at location 16.

After vector number 2 has been completely decomposed and its segments encoded and transmitted to the threaded queue buffer 200, the vector segment encoder 100 responds to the data available signal on line 154 from the minicomputer. This results in the transmission over line 162 of the proprocessed data for vector number 3 loading registers 102, 104, 106 and 108 of the vector segment encoder. Vector number 3 has a slope of 7 and ¾ and lies in octant number 2 with a length of 4. The large slope residue value stored in the low order slope of register 102 indicates that sufficient slope error will accumulate during the decomposition of vector number 3 so that the error compensating feature of the vector segment encoder will be brought into operation. Table 3 shows the status of the test register 150, the compare register 134, the modified slope adder 140, the modified slope register 142, and the output of the segment encoding matrix 128 for each of the four vector segments into which vector number 3 is decomposed. As the first subvector is processed, the contents of the test register 150 is 0 and this quantity is added to the low order slope value of ¾ and compared in the compare register 134 by means of the comparitor 136 to the value of 0.5 and is found to exceed that value. The comparitor causes the subtracting block 148 to subtract the value of 1 from the contents of the test register 150 and store the difference in the test register 150. The comparitor 136 then enables the gate 128 causing the modified slope adder 140 to add the quantity of 1 to the value of 7 stored in the high order slope portion of register 102 and to enter the sum of 8 into the modified slope register 142. The value of the slope thus corrected is transmitted from the modified slope register 142 to the vector segment encoding matrix 128 which when reduced by 1 and combined with the value 01 stored in the octant portion of the register 104, yields a symbol code of 23 for the first vector segment encoded. The effect of the correction made by enabling the gate 128 is to add the quantity ¼ to the true slope of vector number 3, thereby incorporating a round-off error of that magnitude. This round-off error of ¼ is stored as a negative ¼ in the test register 150. During the encoding of the second vector segment, the quantity stored in the test register 150 of minus ¼ is added to the quantity of ¾ stored in the low order portion of the slope register 102 yielding the sum of ½ which is entered into the compared register 134. The comparitor 136 determines that this quantity is equal to or greater than 0.5 and once again causes the subtract block 148 to subtract the quantity 1 from the contents of the test register and substitute that difference back into the test register 150 and enables the gate 128. The quantity 1 is added by the modified slope adder 140 to the contents of value 7 of the high order slope portion of the register 102 yielding a modified slope value of 8 which is stored in the modified slope register 142. Again the vector segment encoding matrix 128 generates a vector segment code of 23 for the second vector segment. During the encoding of the third vector segment, the value of the contents stored in the test register 150 is minus ½ and this quantity is added by means of the adder 132 to the low order slope of quantity ¾ stored in register 102, yielding a sum of ¼ which is stored in the compare register 134. This quantity if determined by the comparitor 136 to be less than the quantity 0.5, and, therefore, the contents of the compare register 134 is transferred and substituted for the contents of the test register 150, and the gate 128 remains disabled. The modified slope adder 140 therefore merely transfers the value 7 from the high order slope register 102 to the modified slope register 142 thereby not incorporating a correction to the high order slope value. In effect, this compensates for the accumulation of round-off error due to the corrections made in the slope of the encoded first and second vector segments. The quantity is transferred from the modified slope register 142 to the segment encoding matrix 128, where it is not reduced by 1, since it is less than 8, as in FIG. 10. It is combined with the value of 01 stored in the octant register 104 yielding a vector symbol code of 23 which is placed on the output line 130. The X coordinate for the origin of the address element left for the first subvector was calculated to be 209 and for the second subvector was calculated to be 217, and for the third subvector was calculated to be 225. A difference of 8 units exists between the X values of the first, second, and third subvectors encoded. But due to the compensation for the accumulation of roundoff error incorporated into the encoded third vector segment, the resulting X coordinate for the fourth vector segment, which must be graphically continuous with the third vector segment, is modified as is shown in table 3. After the data word for the word vector segment has been calculated and outputted to the threaded queue buffer 200, the vector segment encoder control 152 causes the ALU to add the quantity 7 stored in the modified slope register to the X coordinate of the third vector segment which is still stored in a register 110, substituting this sum for the contents of the X register 110. Thus, instead of the difference between successive values of X for the coordinates of the address elements left in successive vector segments being 8, the value of the X coordinate for the origin of the fourth vector segment encoded is 232 which is just 7 units less than the previous value calculated for the third vector segment of 225. During the encoding of the fourth vector segment the contents of the test register 150 has a value of ¼. This value is added to the contents of the low order slope of quantity ¾ in the adder 132 and the sum of 'is entered into the compare register 134. The comparitor 136 determines that this quantity is greater than 0.5 and, therefore, causes the subtract block 148 to subtract the quantity 1 from the contents stored in the test register 150 replacing the difference in the test register 150 and also enabling the gate 128. The modified slope adder 140 thereby adds the quantity 1 to the high order slope value of 7 stored in the register 102 and this sum of value 8 is stored in the modified slope register 142. The modified slope of 8 is transferred from the modified slope register 142 to the segment encoding matrix 128 and when combined with the quantity 01 stored in the octant register 104 yields the vector segment code 23 for the forth vector segment which is outputted on line 130. Thus is concluded the decomposition of the vector number 3, having incorporated a correction for accumulated roundoff errors due to the approximation of the true slope of vector number 3 by the fixed slope of the vector segment symbols which will represent it.

Table 7 shows the status of the queue memory 202 and the index memory 234 after the first, second, third and fourth vector segments of the vector number 3 have been loaded into the threaded queue buffer 200. The three data threads of table **6*b* have been elongated to include the vector number 3 subvector data and the thread of empty location has been reduced in length. The data thread corresponding to Y = 224 has a head located at queue location 9, which points to queue location 6 which in turn points to queue location 1, the end of the thread, the data thread corresponding to Y = 208 has its head located at queue location 10 which in turn points to queue location 7 which in turn points to queue location 3 which constitutes the end of that data thread. Data thread corresponding to Y = 192 has its head located at queue location 11 which in turn points to queue location 8 which in turn points to queue location 5 which constitutes the end of that thread. Queue location 12 contains the only data stored corresponding to the Y coordinate 176 and, therefore, has a 1 bit in the end of thread field. The thread of empty locations has its head located at queue location 13 as is indicated in the NER, and ends at queue location 16.**

It is convenient to assume that during the proceeding period when vector numbers 1, 2 and 3 were being decomposed by the vector segment encoder 100 and their encoded vector segment were being loaded into the threaded queue buffer 200, the elastic refresh buffer was reading out and displaying data stored for Y raster line locations from Y = 225 to Y = 1023 and from Y = 0 to Y = 175. This assumption permits completion of the loading process before starting the transfer to the elastic refresh buffer. In this display mode, a form of split cycle is used in the elastic refresh buffer in which display data is read from the wrap around memory 306 at the top of a packed data cluster at a location whose address is stored in the read address register 302. The first word read out is the control word shown in FIG. **13*c* containing the Y value for the raster location of the data associated with it. This Y value is stored in the Y register 310 and the previous contents of the Y register 310 is transferred to the Y' register 318. The contents of the Y register 310 is continuously compared by means of the comparitor 316 with the TV line number 320 presently being displayed in the display monitor 700. Since the order of readout of the display data from the wrap around memory 306 is by ascending values of Y, the value of the contents stored in the Y' register 318 will be less than the value of the contents stored in the Y register 310. Thus, the index memory 232 of the threaded queue buffer 200 can be interrogated at Y index value locations of from Y' + 1 to Y during the period that the control word of value Y remains stored in the Y register 310, so as to determine if the queue memory 202 has displayed data stored therein for responding to a value of Y index between Y' and 1 and Y. Thus the interrogation of the index memory is accomplished by the counter 362 in the refresh buffer adding integer values to the contents of the Y' register and outputting those values as Y index on line 206. This sum is compared in the compare means 364 with the value of Y stored in the Y register 310 and when the sum Y index equals the contents stored in the Y register 310 the index memory locations between Y' + 1 and Y have been exhausted. Then, when the difference between the contents of the Y register 310 and the TV line number 320 is between 1 and 8, the display data words corresponding to the Y value stored in the Y register 310 are read from the top of the packed data cluster in the wrap around memory 306 and are presented over output lines 314 along with the Y value outputted on line 368, to the symbol generator 400. When the symbol generator accepts the word it causes the X address to be transferred to the appropriate PRAS module 604 and the display data word is rewritten in the wrap around memory at the bottom of the packed data cluster at the location specified by the write address register 304**.

Thus, when the control word containing a Y value of Y = 100 is read from the wrap around memory 306 and inserted in the Y register 310, the comparitor 364 determines that it is greater than the previous contents of the Y register 310, which is now located in the Y' register 310. When this condition obtains, values of Y index are generated between the contents stored in the Y' register and Y = 100 and the threaded queue buffer control 210 signals an unloaded complete signal on line 236 for each interrogation since there is no data stored at these locations in the queue memory 202. After the value of Y index has been incremented and equals the value Y = 100 in the Y register, and when the TV line number value is between 92 and 99, the display data stored in the wrap around memory at the top of the packed data cluster is read out to the symbol generator 400 for display, and then rewritten at the bottom of the packed data cluster in the wrap around memory 306 at the address specified by the right address register 304.

The next control word stored in the elastic refresh buffer has a Y value of 195, and is read from the wrap around memory 306 and inserted in the Y register 310. The previous contents of the Y register 310 having the value of 100 is transferred to the Y' register 318. Now so long as the value of the TV line number 320 is less than the value of 187, the index memory 232 of the threaded queue buffer can be interrogated for Y index values of from 100 to 195. The control 338 sets the counter 362 to 0 and the cyclic incrementation of the Y index value on line 206 commences. When the value of Y index equals 176, the threaded queue buffer control 210 generates a signal on line 234 that data is present. The data referred to by the threaded queue buffer is the encoded word for the fourth vector segment of vector number 3. The Y index value of 176 is gated into the wrap around memory as the control word shown in FIG. 13*c* for the data to be loaded from the threaded queue buffer corresponding to Y = 176. This control word is loaded in the wrap around memory 306 at the bottom of the packed data cluster at the address stored in the write address register 304. Simultaneously, the refresh buffer control 338 increments the word counter 328 by unity, thereby incrementing the write address by one while leaving the read address in the read address register 302 unaffected. A queue unloaded command signal is generated by control 338 on line 230 and the threaded queue buffer commences to unload all of the display data stored in the queue memory 202 corresponding to the value of Y index of 176.

In the threaded queue buffer 200, the Y index value of 176 is inputted over line 206 to the index address register 216. The index pointer word corresponding to Y 176 is accessed from the index memory 232 and outputted to the index data register and temporary address registers 218 and 220 respectively. The E/NE bit 222 in the index data register is set to 0 since the queue memory 202 is unloaded of the corresponding display data, the queue will be empty thereof. The contents of the index data register 218 is the rewritten into the index memory 232. The address field of the TAR 220 is loaded into the queue address register 224 and the head of the thread for data associated with Y = 176 is accessed in the queue memory 202 and loaded into the queue data register 226. The threaded queue buffer control 210 now goes to data present signal on line 234 and then the desired data is read out of the queue data register of line 238 and loaded into the wrap around memory 306 of the elastic refresh buffer. The format for the display data loaded into the wrap around memory is shown in FIG. 13*a*. This data is loaded at the bottom of the packed data cluster in the memory 306 at the location specified by the write address register 304. The refresh buffer control 338 then increments the word counter 328 by 1 and causes the write address register 304 to increment its contents by 1 while the contents of the read address register 302 remains the same. In the threaded queue buffer 200, the end of the thread bits 328 and the next address field in the queue data register 226 are loaded by means of line 262 into the flag bit and address field of the temporary address register 220. The contents of the next empty register 214 is then loaded by means of line 276 into the end of thread bit 228 and the next address field of the queue data register 226. The contents of the queue data register 226 is then written by means of line 270 into the queue memory 202 at the location stored in the queue address register 224. At the same time, the contents of the queue address register 224 is loaded by means of line 256 into the address field of the next empty register 214 and the end of thread bit 212 is reset to 0 by means of line 278. Flag bit of the temporary data register 220 is now tested by means of line 280 at the control 210. If it is a 1, there is no data for the Y coordiate and the unload complete signal is given on line 236. The result of this operation is shown in the table 8*a*. It is seen that the thread of empty locations has backed up to incorporate the location 12 where the display data corresponding to Y = 176 has been unloaded.

The elastic refresh buffer resumes incrementing the value of Y index on line 206 and interrogating the index memory 232. When the value of Y index = 192 the threaded queue buffer control 210 generates a data present signal on line 234. Thus, the value of Y index of 192 is gated into the wrap around memory 306 from adder 360, at the bottom of the packed data cluster as a control word loaded at the location specified by the write address register 304. The control 338 increments the word counter 328 by 1 and the write address contained in the write address 304 by 1. The control 338 then generates the queue unload command on line 230. Table 8*a* shows the status of the queue memory 202 when the queue unload command is given. The queue location pointer in the index memroyr 232 corresponding to the Y coordinate 192, points to the queue location 11 in the queue memory 202 as being the head of the thread of data corresponding to Y = 192. As the display data in queue location 11 is accessed and outputted on line 238 queue buffer control 210 issued a data present pulse over line 234 to the control 338. This vector segment word corresponds to the third vector segment of vector number 3, and is loaded in the wrap around memory 306 of the elastic refresh buffer at the bottom of the packed data cluster. As the queue location 11 is unloaded from the queue memory 202 it is placed at the head of the thread of empty locations in the queue memory by means of transferring its queue location number to the next empty register address field. The temporary address register 220 contains in its address field the pointer value which was located in the next address location of the data word in queue location 11, and designates queue location number 8 as the next location in the queue memory 202 which will be unloaded and outputted on line 238 to the refresh buffer. This encoding vector word corresponds to the second vector segment of vector number 2, and is loaded in the wrap around memory 306 of the elastic refresh buffer at the bottom of the packed data cluster. The word counter 328 and the write address register 304 are both incremented by 1. The next location field of the data word stored at queue location 8 contains the value 5 and points to queue location 5 which is the end of the data thread corresponding to a Y value of 192. Location 5 is unloaded and outputted on line 238 to the elastic refresh buffer. Data word stored in queue location 5 corresponds to the fifth vector segment in the first vector word, and is loaded in the wrap around memory 306 of the elastic refresh buffer at the bottom of the packed data cluster. The word counter 328 and the write address 304 are both incremented by 1. Table 8*b* shows the status of the queue memory 202 after the data thread corresponding to a Y value of 192 has been unloaded. Queue location 5 which was the end of the data thread for Y = 192 is now the next empty register as is indicated in the address field of the NER, and represents the head of the thread of empty locations in the queue memory. Note that as data from the queue memory is unloaded, the respective locations are threaded into the thread of empty locations. When the end of thread bit is detected the threaded queue buffer control 210 signals on line 236 an unload complete and the refresh buffer control 338 resumes the incrementation of the Y index value on line 206 until Y index equals 195, the value now stored in the Y register 310. When the TV line number is between 187 and 194, the display data corresponding to the Y index value of 195 is read from the refresh buffer at the top of the packed data cluster at a location corresponding to the read address register 302, and is displayed and rewritten at the bottom of the packed data cluster at the location specified by the write address register 304. The read address and the write address are then incremented by 1 and subsequent display words are read out and displayed.

During this period the elastic refresh buffer is busy reading out and displaying previously stored display data. There is no signal present on the queue unload command line 230. The threaded queue buffer 200 is, therefore, available for accepting new data inputted from the vector segment encoder 100 or the minicomputer 50. At this time the threaded queue buffer gets a data available signal from the minicomputer indicating that the alphanumeric symbol B is ready for loading at Y line 176. The threaded queue buffer control 210 issues a load command to the minicomputer and the encoded alphanumeric symbol the letter B is loaded into the queue location 5 which is the next empty register as indicated by the address field of the NER. The status of the queue memory 202 and the index memory 232 at this time are shown in table 9.

Each encoded alphanumeric and the vector segment symbol is available for transmission to the symbol generator 400 when the difference between the Y register 310 and the TV line number 320 is less than 8. Reference to FIG. 7*a* illlustrating the PRAS operation will show why this is so. If the alphanumeric symbol 1 is desired to be written into the PRAS, only the A or the B field will be written at any one time, due to the interlaced scanning of the DTV display. Thus, if the encoded alphanumeric symbol representing the letter 1 is read out from the elastic refresh buffer 300 precisely at the time that the difference between the Y value at which the letter is to be displayed and the TV line number equals 8, the A field for the letter 1 will be assembled in the PRAS as is shown in FIG. 7*a*. If the difference between the Y raster line at which the letter is to be displayed and the TV line number which is presently being displayed is precisely 7, the location of the A field for the alphanumeric symbol 1 will be that as is shown in FIG. 7*b* in the PRAS. It can be seen that since there are 14 storage units 800 in the PRAS where the symbol may be assembled, and since the A field of the symbol occupies 8 of those storage units, there is a time window 7 storage units wide in which the symbol to be displayed may be assembled. Thus, when the difference between the Y register 310 and the TV line number 320 is greater than 8, the symbol could not be completely assembled in the section 800 of the PRAS. If this difference were less than 1, this display information transmitted from the refresh buffer to the PRAS by way of the symbol generator would arrive too late to be assembled in section 800 of the PRAS.

When the difference between Y register and the TV line number is 8 or less, a data available signal is generated by control 338 of the elastic refresh buffer on line 348 and if the symbol generator 400 is not busy, the data accepted signal will be generated by the control 402 of the symbol generator on line 346. The elastic refresh buffer will then cyclically read out the data for display. The encoded symbol data will be decoded in the symbol store 410, 412, 413, 414 of the symbol generator into a corresponding pattern of raster illumination signals. These raster illumination signals are passed by means of the multiplexer 415 to the appropriate channel and PRAS control 430. In the present example, vector 1 will be assembled in the blue PRAS 444, vector 2 will be assembled in the red PRAS 440, and the vector 3 will be assembled in the green PRAS 442 of channel 1. The vectors as shown in FIG. 16 are displayed on the DTV monitor 700.

It should be noted that the previous discussion describes only one of the possible implementations of the invention. It will be apparent to one skilled in the art that the index 232 and the queue 202 can be in the same memory and that some of the registers, such as the QDR 226 and the IDR 218 can be combined. Also, more than one pointer can be stored in an index word and queue words can be grouned into multiword slots. Also, other operations such as read without unloading can be implemented. Also, other methods for returning slots to the empty list can be implemented and a plurality of empty lists can be employed, so long as a means of threading to another, is provided when one is deplected. One of the keys to the threaded queue buffer is the returning of the slots to a list or lists of empties in such a way that they can be found when needed without searching.

It should be noted that the preceding discussion describes only one of the possible implementations of the invention. In particular it will be apparent to one skilled in the art that the threaded queue buffer can be used directly for refresh without employing a separate refresh buffer, that some or all of the minicomputer functions could be done in dedicated hardware, and that elements such as buffers and symbol stores may be shared or dedicated to a single channel.

While the invention has been particularly shown and described with reference to preferred embodiments thereof, it will be understood by those skilled in the art that the foregoing and other changes in form and details may be made therein without deparing from the spirit and the scope of the invention.

Table 1

Vector 1
(X1, Y1) = (161, 224)
(X2, Y2) = (240, 184 176/256)
Vector Slope = 8 1/16
Octant = 1
Distance = 5

| Vector No. 1 Intercepts X | Y | Vector Segment X REG. (116) | Y REG. (206) | Test Register (150) | Compare Register (134) | Adder (140) | Modified Slope (142) | Symbol Code (130) |
|---|---|---|---|---|---|---|---|---|
| 161 | 224 | 161 | 224 | 0 | 1/16 | 0 | 8 | 7 |
| 177 | 215 15/16 | 177 | 216 | 1/16 | 2/16 | 0 | 8 | 7 |
| 193 | 207 14/16 | 193 | 208 | 2/16 | 3/16 | 0 | 8 | 7 |
| 209 | 199 13/16 | 209 | 200 | 3/16 | 4/16 | 0 | 8 | 7 |
| 225 | 191 12/16 | 225 | 192 | 4/16 | 5/16 | 0 | 8 | 7 |

Table 2

Vector 2
(X1, Y1) = (193, 224)
(X2, Y2) = (240, 177)
Vector Slope = 16
Octant = 1
Distance = 3

| Vector No. 2 Vector No. 2 Intercepts X | Y | Vector Segment X REG. (116) | Y REG. (206) | Test Register (150) | Compare Register (134) | Adder (140) | Modified Slope (142) | Symbol Code (130) |
|---|---|---|---|---|---|---|---|---|
| 193 | 224 | 193 | 224 | 0 | 0 | 0 | 16 | 15 |
| 209 | 208 | 209 | 208 | 0 | 0 | 0 | 16 | 15 |
| 225 | 192 | 225 | 192 | 0 | 0 | 0 | 16 | 15 |

Table 3

Vector 3
(X1, Y1) = (209, 224)
(X2, Y2) = (239, 161)
Vector Slope = 7¾
Octant = 2
Distance = 4

| Vector No. 3 Intercepts X | Y | Vector segment X REG. (116) | Y REG. (206) | Test Register (150) | Compare Register (134) | Adder (140) | Modified Slope (142) | Symbol Code (130) |
|---|---|---|---|---|---|---|---|---|
| 209 | 224 | 209 | 224 | 0 | ¾ | 1 | 8 | 23 |
| 216¾ | 208 | 217 | 208 | —¼ | ½ | 1 | 8 | 23 |
| 224½ | 192 | 225 | 192 | —½ | ¼ | 0 | 7 | 23 |
| 232¼ | 176 | 232 | 176 | ¼ | 1 | 1 | 8 | 23 |

TABLE 4

Initial State of Threaded Queue

| INDEX | | | MESSAGE QUEUE | | | | | | | | | |
|---|---|---|---|---|---|---|---|---|---|---|---|---|
| | | | | | | DATA | | | | | | |
| Y Coor'd | E/NE | Queue Location Pointer | Queue Location | E O Th | Next Location | Write | Channel | X Coor'd | Color | Blink | Sub-Vector Length | Symbol Code |
| : • | • | • | | | | | | | | | | |
| 224 | 0 | b | 1 | 0 | 2 | | | b | | | | |
| : • | • | • | 2 | 0 | 3 | | | b | | | | |

TABLE 4-continued

Initial State of Threaded Queue

| INDEX | | | MESSAGE QUEUE | | | | | | | | | |
|---|---|---|---|---|---|---|---|---|---|---|---|---|
| | | | | | | DATA | | | | | | |
| Y Coor'd | E/NE | Queue Location Pointer | Queue Location | E O Th | Next Location | Write | Channel | X Coor'd | Color | Blink | Sub-Vector Length | Symbol Code |
| 216 | 0 | b | 3 | 0 | 4 | | | b | | | | |
| | | | 4 | 0 | 5 | | | b | | | | |
| 208 | 0 | b | 5 | 0 | 6 | | | b | | | | |
| | | | 6 | 0 | 7 | | | b | | | | |
| 200 | 0 | b | 7 | 0 | 8 | | | b | | | | |
| | | | 8 | 0 | 9 | | | b | | | | |
| 192 | 0 | b | 9 | 0 | 10 | | | b | | | | |
| | | | 10 | 0 | 11 | | | b | | | | |
| 184 | 0 | b | 11 | 0 | 12 | | | b | | | | |
| | | | 12 | 0 | 13 | | | b | | | | |
| 176 | 0 | b | 13 | 0 | 14 | | | b | | | | |
| | | | 14 | 0 | 15 | | | b | | | | |
| 168 | 0 | b | 15 | 0 | 16 | | | b | | | | |
| | | | 16 | 1 | b | | | b | | | | |
| 160 | | | QDR | b | b | | | b | | | | |
| IDR | b | b | NER | 0 | 1 | | | | | | | |
| | E/NE | | | EOT | | | | | | | | |
| TAR | b | b | QAR | | b | | | | | | | |
| | FLAG | | | | | | | | | | | |

TABLE 5a

Load Vector 1 into Queue
First Subvector (161,224)

| INDEX | | | MESSAGE QUEUE | | | | | | | | | |
|---|---|---|---|---|---|---|---|---|---|---|---|---|
| | | | | | | DATA | | | | | | |
| Y Coor'd | E/NE | Queue Location Pointer | Queue Location | E O Th | Next Location | Write | Channel | X Coor'd | Color | Blink | Sub-Vector Length | Symbol Code |
| 224 | 1 | 1 | 1 | 1 | b | 1 | 2 | 61 | B | 0 | 16 | 7 |
| | | | 2 | 0 | 3 | | | b | | | | |
| 216 | 0 | b | 3 | 0 | 4 | | | b | | | | |
| | | | 4 | 0 | 5 | | | b | | | | |
| 208 | 0 | b | 5 | 0 | 6 | | | b | | | | |
| | | | 6 | 0 | 7 | | | b | | | | |
| 200 | 0 | b | 7 | 0 | 8 | | | b | | | | |
| | | | 8 | 0 | 9 | | | b | | | | |
| 192 | 0 | b | 9 | 0 | 10 | | | b | | | | |
| | | | 10 | 0 | 11 | | | b | | | | |
| 184 | 0 | b | 11 | 0 | 12 | | | b | | | | |
| | | | 12 | 0 | 13 | | | b | | | | |
| 176 | 0 | b | 13 | 0 | 14 | | | b | | | | |
| | | | 14 | 0 | 15 | | | b | | | | |
| 168 | 0 | b | 15 | 0 | 16 | | | b | | | | |
| | | | 16 | 1 | b | | | b | | | | |
| 160 | 0 | b | QDR | 1 | b | 1 | 2 | 161 | B | 0 | 16 | 7 |
| IDR | 1 | 2 | NER | 0 | 2 | | | | | | | |
| | E/NE | | | EOT | | | | | | | | |
| TAR | 0 | b | QAR | | 2 | | | | | | | |
| | FLAG | | | | | | | | | | | |

TABLE 5b

Load Vector 1 into Queue
Second Subvector (177,216)

| INDEX | | | MESSAGE QUEUE | | | | | | | | | |
|---|---|---|---|---|---|---|---|---|---|---|---|---|
| | | | | | | DATA | | | | | | |
| Y Coor'd | E/NE | Queue Location Pointer | Queue Location | E O Th | Next Location | Write | Channel | X Coor'd | Color | Blink | Sub-Vector Length | Symbol Code |
| 224 | 1 | 1 | 1 | 1 | b | 1 | 2 | 161 | B | 0 | 16 | 7 |
| | | | 2 | 1 | b | 1 | 2 | 177 | B | 0 | 16 | 7 |
| 216 | 1 | 2 | 3 | 0 | 4 | | | b | | | | |
| | | | 4 | 0 | 5 | | | b | | | | |
| 208 | 0 | b | 5 | 0 | 6 | | | b | | | | |
| | | | 6 | 0 | 7 | | | b | | | | |
| 200 | 0 | b | 7 | 0 | 8 | | | b | | | | |
| | | | 8 | 0 | 9 | | | b | | | | |
| 192 | 0 | b | 9 | 0 | 10 | | | b | | | | |
| | | | 10 | 0 | 11 | | | b | | | | |
| 184 | 0 | b | 11 | 0 | 12 | | | b | | | | |
| | | | 12 | 0 | 13 | | | b | | | | |
| 176 | 0 | b | 13 | 0 | 14 | | | b | | | | |
| | | | 14 | 0 | 15 | | | b | | | | |

TABLE 5b-continued

Load Vector 1 into Queue
Second Subvector (177,216)

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 1 | b | 1 | 2 | 177 | B | 0 | 16 | 7 |
| IDR | 1 | 2 | NER | 0 | 3 | | | | | | | |
| | E/NE | | | EOT | | | | | | | | |
| TAR | 0 | b | QAR | | 2 | | | | | | | |
| | FLAG | | | | | | | | | | | |

TABLE 5c

Load Vector 1 into Queue
Third, Fourth, & Fifth Subvectors - (193,208);(209,200);(225,192)

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| : • | • | • | | | | | | | | | | |
| 224 | 1 | 1 | 1 | 1 | b | 1 | 2 | 161 | B | 0 | 16 | 7 |
| : • | • | • | 2 | 1 | b | 1 | 2 | 177 | B | 0 | 16 | 7 |
| 216 | 1 | 2 | 3 | 1 | b | 1 | 2 | 193 | B | 0 | 16 | 7 |
| : • | • | • | 4 | 1 | b | 1 | 2 | 209 | B | 0 | 16 | 7 |
| 208 | 1 | 3 | 5 | 1 | b | 1 | 2 | 225 | B | 0 | 16 | 7 |
| : • | • | • | 6 | 0 | 7 | | | b | | | | |
| 200 | 1 | 4 | 7 | 0 | 8 | | | b | | | | |
| : • | • | • | 8 | 0 | 9 | | | b | | | | |
| 192 | 1 | 5 | 9 | 0 | 10 | | | b | | | | |
| : • | • | • | 10 | 0 | 11 | | | b | | | | |
| 184 | 0 | b | 11 | 0 | 12 | | | b | | | | |
| : • | • | • | 12 | 0 | 13 | | | b | | | | |
| 176 | 0 | b | 13 | 0 | 14 | | | b | | | | |
| : • | • | • | 14 | 0 | 15 | | | b | | | | |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 1 | b | 1 | 2 | 225 | B | 0 | 16 | 7 |
| IDR | 1 | 5 | NER | 0 | 6 | | | | | | | |
| | E/NE | | | EOT | | | | | | | | |
| TAR | 0 | b | QAR | | 5 | | | | | | | |
| | FLAG | | | | | | | | | | | |

TABLE 6a

Load Vector 2 into Queue
First Subvector (193,224)

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| : • | • | • | | | | | | | | | | |
| 224 | 1 | 6 | 1 | 1 | b | 1 | 2 | 161 | B | 0 | 16 | 7 |
| : • | • | • | 2 | 1 | b | 1 | 2 | 177 | B | 0 | 16 | 7 |
| 216 | 1 | 2 | 3 | 1 | b | 1 | 2 | 193 | B | 0 | 16 | 7 |
| : • | • | • | 4 | 1 | b | 1 | 2 | 209 | B | 0 | 16 | 7 |
| 208 | 1 | 3 | 5 | 1 | b | 1 | 2 | 225 | B | 0 | 16 | 7 |
| : • | • | • | 6 | 0 | 1 | 1 | 2 | 193 | R | 0 | 16 | 15 |
| 200 | 1 | 4 | 7 | 0 | 8 | | | b | | | | |
| : • | • | • | 8 | 0 | 9 | | | b | | | | |
| 192 | 1 | 5 | 9 | 0 | 10 | | | b | | | | |
| : • | • | • | 10 | 0 | 11 | | | b | | | | |
| 184 | 0 | b | 11 | 0 | 12 | | | b | | | | |
| : • | • | • | 12 | 0 | 13 | | | b | | | | |
| 176 | 0 | b | 13 | 0 | 14 | | | b | | | | |
| : • | • | • | 14 | 0 | 15 | | | b | | | | |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 0 | 1 | 1 | 2 | 193 | R | 0 | 16 | 15 |
| IDR | 1 | 6 | NER | 0 | 7 | | | | | | | |
| | E/NE | | | EOT | | | | | | | | |
| TAR | 1 | 1 | QAR | | 6 | | | | | | | |
| | FLAG | | | | | | | | | | | |

TABLE 6b

Load Vector 2 into Queue
Second and Third Subvectors (209,208) and (225,192)

INDEX

| Y Coor'd | E/NE | Queue Location Pointer |
|---|---|---|
| 224 | 1 | 6 |
| 216 | 1 | 2 |
| 208 | 1 | 7 |
| 200 | 1 | 4 |
| 192 | 1 | 8 |
| 184 | 0 | b |
| 176 | 0 | b |
| 168 | 0 | b |
| 160 | 0 | b |
| IDR | 1 (E/NE) | 8 |
| TAR | 1 (FLAG) | 5 |

MESSAGE QUEUE

| Queue Location | E O Th | Next Location | Write | Channel | X Coor'd | Color | Blink | Sub-Vector Length | Symbol Code |
|---|---|---|---|---|---|---|---|---|---|
| | | | DATA | | | | | | |
| 1 | 1 | b | 1 | 2 | 161 | B | 0 | 16 | 7 |
| 2 | 1 | b | 1 | 2 | 177 | B | 0 | 16 | 7 |
| 3 | 1 | b | 1 | 2 | 193 | B | 0 | 16 | 7 |
| 4 | 1 | b | 1 | 2 | 209 | B | 0 | 16 | 7 |
| 5 | 1 | b | 1 | 2 | 225 | B | 0 | 16 | 7 |
| 6 | 0 | 1 | 1 | 2 | 193 | R | 0 | 16 | 15 |
| 7 | 0 | 3 | 1 | 2 | 209 | R | 0 | 16 | 15 |
| 8 | 0 | 5 | 1 | 2 | 225 | R | 0 | 16 | 15 |
| 9 | 0 | 10 | | | b | | | | |
| 10 | 0 | 11 | | | b | | | | |
| 11 | 0 | 12 | | | b | | | | |
| 12 | 0 | 13 | | | b | | | | |
| 13 | 0 | 14 | | | b | | | | |
| 14 | 0 | 15 | | | b | | | | |
| 15 | 0 | 16 | | | b | | | | |
| 16 | 1 | b | | | b | | | | |
| QDR | 0 | 5 | 1 | 2 | 225 | R | 0 | 16 | 15 |
| NER | 0 (EOT) | 9 | | | | | | | |
| QAR | | 8 | | | | | | | |

TABLE 7

Load Vector 3 into Queue
First, Second, Third & Fourth Subvectors
(209,224);(217,208);(225,192);&(232,176)

INDEX

| Y Coor'd | E/NE | Queue Location Pointer |
|---|---|---|
| 224 | 1 | 9 |
| 216 | 1 | 2 |
| 208 | 1 | 10 |
| 200 | 1 | 4 |
| 192 | 1 | 11 |
| 184 | 0 | b |
| 176 | 1 | 12 |
| 168 | 0 | b |
| 160 | 0 | b |
| Idr | 0 (E/NE) | 12 |
| TAR | 0 (FLAG) | b |

MESSAGE QUEUE

| Queue Location | E O Th | Next Location | Write | Channel | X Coor'd | Color | Blink | Sub-Vector Length | Symbol Code |
|---|---|---|---|---|---|---|---|---|---|
| | | | DATA | | | | | | |
| 1 | 1 | b | 1 | 2 | 161 | B | 0 | 16 | 7 |
| 2 | 1 | b | 1 | 2 | 177 | B | 0 | 16 | 7 |
| 3 | 1 | b | 1 | 2 | 193 | B | 0 | 16 | 7 |
| 4 | 1 | b | 1 | 2 | 209 | B | 0 | 16 | 7 |
| 5 | 1 | b | 1 | 2 | 225 | B | 0 | 16 | 7 |
| 6 | 0 | 1 | 1 | 2 | 193 | R | 0 | 16 | 15 |
| 7 | 0 | 3 | 1 | 2 | 209 | R | 0 | 16 | 15 |
| 8 | 0 | 5 | 1 | 2 | 225 | R | 0 | 16 | 15 |
| 9 | 0 | 6 | 1 | 2 | 209 | G | 0 | 16 | 23 |
| 10 | 0 | 7 | 1 | 2 | 217 | G | 0 | 16 | 23 |
| 11 | 0 | 8 | 1 | 2 | 225 | G | 0 | 16 | 23 |
| 12 | 1 | b | 1 | 2 | 232 | G | 0 | 16 | 23 |
| 13 | 0 | 14 | | | b | | | | |
| 14 | 0 | 15 | | | b | | | | |
| 15 | 0 | 16 | | | b | | | | |
| 16 | 1 | b | | | b | | | | |
| QDR | 1 | b | 1 | 2 | 232 | G | 0 | 16 | 23 |
| NER | 0 (EOT) | 13 | | | | | | | |
| QAR | | 12 | | | | | | | |

TABLE 8a

Unload All Data with y = 176

INDEX

| Y Coor'd | E/NE | Queue Location Pointer |
|---|---|---|
| 224 | 1 | 9 |
| 216 | 1 | 2 |
| 208 | 1 | 10 |
| 200 | 1 | 4 |
| 192 | 1 | 11 |
| 184 | 0 | b |

MESSAGE QUEUE

| Queue Location | E O Th | Next Location | Write | Channel | X Coor'd | Color | Blink | Sub-Vector Length | Symbol Code |
|---|---|---|---|---|---|---|---|---|---|
| | | | DATA | | | | | | |
| 1 | 1 | b | 1 | 2 | 161 | B | 0 | 16 | 7 |
| 2 | 1 | b | 1 | 2 | 177 | B | 0 | 16 | 7 |
| 3 | 1 | b | 1 | 2 | 193 | B | 0 | 16 | 7 |
| 4 | 1 | b | 1 | 2 | 209 | B | 0 | 16 | 7 |
| 5 | 1 | b | 1 | 2 | 225 | B | 0 | 16 | 7 |
| 6 | 0 | 1 | 1 | 2 | 193 | R | 0 | 16 | 15 |
| 7 | 0 | 3 | 1 | 2 | 209 | R | 0 | 16 | 15 |
| 8 | 0 | 5 | 1 | 2 | 225 | R | 0 | 16 | 15 |
| 9 | 0 | 6 | 1 | 2 | 209 | G | 0 | 16 | 23 |
| 10 | 0 | 7 | 1 | 2 | 217 | G | 0 | 16 | 23 |
| 11 | 0 | 8 | 1 | 2 | 225 | G | 0 | 16 | 23 |

TABLE 8a-continued

Unload All Data with y = 176

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| : • | • | • | 12 | 0 | 13 | | | b | | | | |
| 176 | 0 | 12 | 13 | 0 | 14 | | | b | | | | |
| : • | • | • | 14 | 0 | 14 | | | b | | | | |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 0 | 13 | | | b | | | | |
| IDR | 0 | 12 | NER | 0 | 12 | | | | | | | |
| | E/NE | | | EOT | | | | | | | | |
| TAR | 1 | b | QAR | | 12 | | | | | | | |
| | FLAG | | | | | | | | | | | |

TABLE 8b

Unload All Data with y = 192

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| : • | • | • | | | | | | | | | | |
| 224 | 1 | 9 | 1 | 1 | b | 1 | 2 | 161 | B | 0 | 16 | 7 |
| : • | • | • | 2 | 1 | b | 1 | 2 | 177 | B | 0 | 16 | 7 |
| 216 | 1 | 2 | 3 | 1 | b | 1 | 2 | 193 | B | 0 | 16 | 7 |
| : • | • | • | 4 | 1 | b | 1 | 2 | 209 | B | 0 | 16 | 7 |
| 208 | 1 | 10 | 5 | 0 | 8 | | | b | | | | |
| : • | • | • | 6 | 0 | 1 | 1 | 2 | 193 | R | 0 | 16 | 15 |
| 200 | 1 | 4 | 7 | 0 | 3 | 1 | 2 | 209 | R | 0 | 16 | 15 |
| : • | • | • | 8 | 0 | 11 | | | b | | | | |
| 192 | 0 | 11 | 9 | 0 | 6 | 1 | 2 | 209 | G | 0 | 16 | 23 |
| : • | • | • | 10 | 0 | 7 | 1 | 2 | 217 | G | 0 | 16 | 23 |
| 184 | 0 | b | 11 | 0 | 12 | | | b | | | | |
| : • | • | • | 12 | 0 | 13 | | | b | | | | |
| 176 | 0 | 12 | 13 | 0 | 14 | | | b | | | | |
| : • | • | • | 14 | 0 | 15 | | | b | | | | |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 0 | 8 | | | b | | | | |
| IDR | 0 | 11 | NER | 0 | 5 | | | | | | | |
| | E/NE | | | EOT | | | | | | | | |
| TAR | 1 | b | QAR | | 5 | | | | | | | |
| | FLAG | | | | | | | | | | | |

TABLE 9

Load alphanumeric Symbol B - (161,184)

| INDEX | | | MESSAGE QUEUE | | | DATA | | | | | | |
|---|---|---|---|---|---|---|---|---|---|---|---|---|
| Y Coor'd | E/NE | Queue Location Pointer | Queue Location | E O Th | Next Location | Write | Channel | X Coor'd | Color | Blink | Sub-Vector Length | Symbol Code |
| : • | • | • | | | | | | | | | | |
| 224 | 1 | 9 | 1 | 1 | b | 1 | 2 | 161 | B | 0 | 16 | 7 |
| : • | • | • | 2 | 1 | b | 1 | 2 | 177 | B | 0 | 16 | 7 |
| 216 | 1 | 2 | 3 | 1 | b | 1 | 2 | 193 | B | 0 | 16 | 7 |
| : • | • | • | 4 | 1 | b | 1 | 2 | 209 | B | 0 | 16 | 7 |
| 208 | 1 | 10 | 5 | 1 | b | 1 | 2 | 161 | B | 1 | b | 65 |
| : • | • | • | 6 | 0 | 1 | 1 | 2 | 193 | R | 0 | 16 | 15 |
| 200 | 1 | 4 | 7 | 0 | 3 | 1 | 2 | 209 | R | 0 | 16 | 15 |
| : • | • | • | 8 | 0 | 11 | | | b | | | | |
| 192 | 0 | 11 | 9 | 0 | 6 | 1 | 2 | 209 | G | 0 | 16 | 23 |
| : • | • | • | 10 | 0 | 7 | 1 | 2 | 217 | G | 0 | 16 | 23 |
| 184 | 1 | 5 | 11 | 0 | 12 | | | b | | | | |
| : • | • | • | 12 | 0 | 13 | | | b | | | | |
| 176 | 0 | 12 | 13 | 0 | 14 | | | b | | | | |
| : • | • | • | 14 | 0 | 15 | | | b | | | | |
| 168 | 0 | b | 15 | 0 | 16 | | | b | | | | |
| : • | • | • | 16 | 1 | b | | | b | | | | |
| 160 | 0 | b | | | | | | | | | | |
| : • | • | • | QDR | 1 | 12 | 1 | 2 | 161 | B | 1 | b | 65 |
| IDR | 1 | 5 | NER | 0 | 8 | | | | | | | |
| | E/NE | | | EOT | | | | | | | | |
| TAR | 0 | b | QAR | | 5 | | | | | | | |
| | FLAG | | | | | | | | | | | |

We claim:

1. A digital television display system having an input connected to the output of a data processor which outputs data to said display system describing the origin, slope and length of a vector to be represented, and an output connected to the input of a digital television monitor for receiving a pattern of raster illumination signals from said display system, comprising in combination:

a vector segment encoder;

said vector segment encoder accepting said data from said data processor, decomposing said vector into a connected sequence of vector segments, and encoding said segments as vector segment words containing coordinate, length and symbol code data;

a threaded queue buffer;

said threaded queue buffer accepting said vector segment words outputted from said words into threaded queues of common raster line value;

an elastic refresh buffer;

said elastic refresh buffer accepting said vector segment words outputted from said threaded queue buffer, storing said vector segment words in an expandable list ordered by raster line value, cyclically reading said vector words from the top of said list and cyclically outputting each word for decoding and displaying, and rewriting each vector segment word at the bottom of said list, cyclically writing at the bottom of said list in the order of Y value, new vector segment words inputted from said threaded queue buffer while suspending said cyclic reading from the top of said list, and cyclically reading from the top of said list, old vector segment words to be purged from said list while suspending said cyclic rewriting at the bottom of said list;

a symbol generator;

said symbol generator accepting vector segment words cyclically outputted by said elastic refresh buffer, decoding each vector segment word, and generating a pattern of raster illumination signals corresponding to each vector segment to be displayed;

a raster assembly storage;

said raster assembly storage accepting from said symbol generator said outputted pattern of raster illumination signals and assembling said signals in synchronism with said cyclic operation of said elastic refresh buffer, for output to and display on said digital television monitor.

2. The digital television display system of claim 1, wherein said vector segment encoder comprises:

a register means for accepting from said data processor, slope, octant, length and coordinate data for the vector to be represented;

a vector length residue means for accepting from said register means said vector length data, cyclically reducing said vector length by subtracting a standard subvector length, cyclically storing said reduced vector length as a residue length, cyclically testing said residue length and cyclically outputting a length for a subvector into which said vector to be represented is decomposed;

a slope modification means for accepting from said register means said slope data, cyclically storing the difference between said slope data and a standard slope for a vector segment into which said vector to be represented is decomposed, correcting an accumulated slope round-off error for selected vector segments, and cyclically outputting the modified slope of vector segments into which said vector to be represented is decomposed;

a coordinate calculating means for cyclically accepting said modified slope data and said octant data and cyclically generating the coordinates for the origin of vector segments into which the vector to be represented is decomposed.

3. The digital television display system of claim 1, wherein said threaded queue buffer comprises:

a queue memory means connected to a data input line for accepting data from said vector segment encoder, for storing data in threaded queues of common raster line value;

an index memory means connected to an input line for accepting raster line values outputted from said vector segment encoder for storing queue pointer addresses at locations corresponding to the raster line value, said pointer addresses specifying the location in said queue memory means of the head of the corresponding thread of data;

said index memory means having an input line connected to the input of said queue memory means for accessing the head of the thread for the corresponding display data stored therein;

a next empty register connected to said queue memory means for storing the location of the head of the thread for the queue of empty registers in said queue memory;

said queue memory means connected to an output data line for outputting display data to said elastic refresh buffer;

control means connected to said next empty register and said queue memory means for reading out of said queue memory on said output line, display data stored in a data thread corresponding to said accepted raster line value in said index memory and threading the emptied location in said queue memory means by means of storing its address in said next empty register as the next head of the thread of empty locations.

4. The digital television display system of claim 1, wherein said elastic refresh buffer comprises:

a wrap around memory n words in length having an input connected to an input line from said threaded queue buffer for accepting display data to be stored in serially adjacent locations in said list which is a packed data cluster;

said wrap around memory being connected to an output line to said symbol generating means;

a memory reading means having an output connected to an input of said memory for cyclically accessing first locations at the head of said data cluster in said memory for destructive readout of display words stored therein to said symbol generator over said output line;

a memory writing means having an output connected to the input of said memory for cyclically accessing to the input of said memory for cyclically accessing second locations at the tail of said data cluster in said memory for rewriting said storage display data words in second locations therein;

control means to halt said cyclic accessing by said memory reading means when new display data is loaded from said input line into said memory at the tail of said data cluster and to halt said cyclic accessing by said memory writing means when display data stored in said memory is to be purged at the head of said data cluster.

5. In the digital television display system, of claim 1, wherein the vector segment encoder further comprises:

said vector segment encoder generating a sequence of vector segment words for describing a vector to be represented as a connected sequence of vector segments selected from a symbol set of $4n$ vector segments, each complete vector segment having orthogonal components of magnitude of $n$ and $m$, where $o \leq m \leq n$, $m$ and $n$ being integers;

an input storage register for receiving origin, length and slope data describing the vector to be represented;

said vector to be represented being oriented with the ordinate of its origin having a magnitude not less than the ordinate of its head;

said slope data composed of an octant portion, a high order portion and a low order portion;

said octant portion describing which of the four octants having a negative ordinate, contains the vector to be represented;

said high order slope portion describing the approximate value as $m/n$ for the tangent of the angles between the vector to be represented and the abscissa or ordinate contained in the octant designated by said octant portion, where $o \leq m \leq n$, and $m$ and $n$ are integers;

said low order slope portion describing the difference between the value $m/n$ of said high order slope portion and the true value of the tangent of said angle;

said length portion composed of a high order portion and a low order portion;

said high order length portion describing the number of complete vector segments having orthogonal components of length $n$ lying along the ordinate or abscissa contained in the octant specified by said octant portion, required to approximate without exceeding the true length of the vector to be represented;

said low order length portion describing the length $l$ of the orthogonal component of the partial vector segment, said component lying along the ordinate or abscissa contained in the octant specified by said octant portion, said partial vector segment being the approximate vector difference between said plurality of complete vector segments and the vector to be represented, where $o \leq l \leq n$;

said origin portion describing the ordinate and abscissa coordinate values for the origin of the vector to be represented;

an $x$ abscissa register and a $y$ ordinate register gateably connected to the origin portion of said input register for storing the value of the coordinate of the origin for a first vector segment and gateably outputting said values on a first output line;

a vector length residue register gateably connected to the high order length portion of said input register, for storing the remaining number of complete vector segments to be encoded for the vector to be represented;

a length residue decrementing means gateably connected to said length residue register for decrementing the contents thereof by unity after each vector segment word is encoded;

a length residue compare means gateably connected to said length residue register for comparing the contents therein with the value zero; and gateably connecting the low order length portion of said input register with a second output line outputting the $l$, where the contents of said length residue register is zero, or where the contents of said length residue register is greater than zero, outputting on said second output line the value $n$, as the length of the orthogonal component of said vector segment being encoded, said component lying along the ordinate or abscissa contained in the octant specified by the octant portion of said input register;

a slope residue adder gateably connected to said low order slope portion of said input register for adding the slope residue for a present vector segment to the accumulated slope residues for previously encoded vector segments of the vector to be represented;

a cummulative slope residue register gateably connected to said slope residue adder, for storing the accumulated slope residues for said previously encoded vector segments, and outputting the cummulative slope residue to said slope residue adder;

a cummulative slope residue comparison means connected to said slope residue adder for comparing the cummulative slope residue with the value 0.5, incrementing the contents of said cummulative slope residue register by the slope residue when the Cummulative Slope Residue is less than 0.5 and decrementing the contents of the Cummulative Slope Residue register by 1.0 when the Cummulative Slope Residue is greater than 0.5;

a modified slope adder gateably connected to said high order slope portion of said input register and connected to said Cummulative Slope Residue comparison means, for selectively modifying the slope of a vector segment being encoded from $m/n$ to $(m+1)/n$ when said Cummulative Slope Residue is greater than 0.5;

a vector segment encoding matrix gateably connected to the output of said modified slope adder and gateably connected to the octant portion of said input register, for converting the octant data and modified slope data to one out of $4n$ vector segment symbol codes stored therein, to be outputted on a third output line;

an arithmetic logic unit gateably connected to the output of said modified slope adder, gateably connected to said octant register, and gateably connected to said $x$ abscissa register and said $y$ ordinate register, for calculating the value of the coordinates for the origin for the next vector segment to be encoded by adding or subtracting the value of $n$ to the contents of the $x$ or the $y$ register when $x$ or $y$ corresponds, respectively to the abscissa or ordinate contained in the octant designated by said octant register, and by adding or subtracting the value of the modified slope to the contents of the $x$ or the $y$ register when $x$ or $y$ does not correspond, respectively to said abscissa or ordinate contained in the octant designated by said octant register;

whereby the vector to be represented is decomposed into a connected sequence of vector segments and said segments are encoded into a sequence of data words describing their origin, length and symbol code selected from a symbol set.

6. In the digital television display system of claim 1, wherein the threaded queue buffer further comprises:

said threaded queue buffer accepting vector words having a random sequence of raster line locations;

an index address register (IAR) connected to an address input line, for storing the inputted raster line address of the display data;

an index memory connected to the output of said IAR, for storing queue pointer addresses in locations corresponding to the raster line address outputted from said IAR:

an index data register (IDR) connected to the output of said index memory, for storing a queue pointer address outputted from said index memory;

a queue address register (QAR) connected to the output of said index data register, for storing the queue address pointer to the head of a thread of display data stored in a queue memory, threaded by raster address;

a queue memory connected to the output of said QAR, for storing display data threaded by raster address, with the head of the thread addressable by the queue pointer address stored in the index;

said IDR having an empty/not empty (E/NE) portion and a pointer portion, each portion corresponding to a category of data stored at each raster address location in the index memory;

said E/NE portion of the IDR signaling whether display data is stored in the queue memory at the queue pointer address and initiating the accessing of the queue memory when a not empty signal is present;

a queue data register (QDR) connected to the output of the queue memory, for storing the display data accessed from a single location in said queue memory;

said QDR having an end of thread (EOT) portion, a next address portion, and a display data portion, each portion corresponding to a category of data stored at each location in said queue memory;

an output line connected to the display data portion of said queue data register, for outputting one word of display data stored in the queue memory corresponding to the inputted raster location;

an EOT portion of said QDR signaling whether the queue memory location accessed with the end of a thread of data corresponding to the inputted raster line address;

said next address portion of said QDR containing the sequence memory location for the next data in the thread corresponding to the inputted raster line address;

a temporary address register (TAR) connected to the output of the EOT and next address portions of the QDR, for temporarily storing the address of the queue memory location for the next display data in the thread corresponding to the inputted raster line address;

a next empty register (NER) whose output is connected to the input of the EOT and next address portions of the QDR, for storing the queue memory location for the head of the thread of empty locations in the queue memory and outputting that location to the QDR;

said QDR having its output connected to the input of said queue memory, for returning to the accessed queue memory location whose address is stored in the QAR, the address of the next empty location, the accessed queue memory location now constituting the head of the thread of empty locations;

said NER input connected to the output of said QAR for transferring the accessed location in the queue memory so as to store in the NER the address of the present location of the head of the thread of empty queue memory locations;

said TAR having an EOT portion signaling whether the queue memory location accessed was the end of a thread of data corresponding to the inputted raster line address;

said TAR having an address portion whose output is connected to the input of the QAR for transferring to the QAR the queue memory location containing the next data in the thread corresponding to the inputted raster line address, if the EOT portion of the TAR signals that the end of the data thread has not been reached;

said data portion of said QDR having its input connected to a data input line, for receiving one word of display data to be loaded into the queue memory corresponding to an inputted raster location on said address input line;

said TDR input connected to the output of said index memory for storing the contents of the location accessed in the index memory by the raster location inputted on said address input line, as the present queue memory location of the head of the thread of data corresponding to said raster location;

said NER having its output connected to the input of said QDR for transferring the present location of the head of the thread of empty locations in the queue memory, as the new queue pointer address for the head of the thread of display data corresponding to the input raster location, to be stored in the index memory;

means for setting said E/NE portion of said IDR to signal that display data is stored in the queue memory at the new queue pointer address;

said IDR having its output connected to the input of said index memory for transferring the new E/NE and pointer address information from the IDR to the index memory location corresponding to the inputted raster location;

said NER having its output connected to the input of said QAR for accessing the present location of the head of the thread of empty locations in the queue memory;

said EOT and next address portions of said QDR having an output connected to the input of said NER for transferring to the NER the address of the next empty register as the new head of the thread of empty registers in the queue memory;

means for setting the EOT portion of the QDR to signal the end of the data thread if the E/NE portion of the TAR signals that no data is presently stored in the queue memory corresponding to the inputted raster location;

said TAR having an output connected to the input of the next address portion of said QDR, for transferring to the QDR the previous location in the queue memory of the head of the thread of data corresponding to the inputted raster location;

said new QDR contents being transferred to the queue memory by said connection between the output of said QDR to the input of said queue memory, at the location which is stored in said QAR as the new head of the thread of data corresponding to the inputted raster location.

7. In the digital television display system of claim 1, wherein the elastic refresh buffer further comprises;

a wrap around memory n words in length having an input connected to an input line for accepting display data to be stored in serially adjacent locations, in a packed data cluster;

a read address register having an output connected to an input of said memory for cyclically accessing first locations at the head of said data cluster in said memory for destructive readout of display words stored therein in an output display means;

a write address register having an output connected to an input of said memory for cyclically accessing second locations at the tail of said data cluster in said memory for rewriting said stored display data words in second locations therein;

a word counting means having an input connected to the output of said read address register and an output connected to an input of said write address register, for counting the number of display data words stored in said data cluster in said memory, adding the count modulo *n*, to the contents stored in said read address register, and loading the sum into said write address register;

an address incrementing means having an output connected to an input of said read address register for loading the read address register with an address sequentially indexed modulo n, prior to each memory access by said read address register;

means to halt said cyclic accessing by said read address register and incrementing said word counting means while cyclically accessing with said write address register when a new display data word is loaded by means of said input line, into said memory;

means to halt said cyclic accessing by said write address register and decrementing said word counting means while cyclically accessing with said read address when a display data word stored in said memory is to be purged.

8. A digital television display system having an input connected to the output of a data processor which outputs data to said display system describing the origin, slope and length of a vector to be represented, comprising in combination:

a vector segment encoder having an input connected to said data processing machine for accepting said origin, slope and length data, which processes said data so as to yield a sequence of vector segment words representing a sequence of component vector segments of the vector to be represented;

each vector segment being a standardized symbol contained in a symbol set and specified by a symbol code;

each vector segment word containing coordinate data specifying an (X, Y) origin, a length and a symbol code for its corresponding vector segment;

a threaded queue buffer having an input connected to said vector segment encoder for accepting vector segment words having a random sequence of (X, Y) origin values, which sorts and stores said words in threaded queues of common Y value;

an Elastic Refresh Buffer having an input connected to said threaded queue buffer for accepting vector segment words having a value of Y specified by the Elastic Refresh Buffer, which stores said vector segment words in a list ordered by Y;

said Elastic Refresh Buffer cyclically reading vector segment words from the top of said ordered list and cyclically outputting each word for decoding and display, and rewriting each vector segment word at the bottom of said list;

said Elastic Refresh Buffer cyclically writing at the bottom of said list in the order of Y value, new vector segment words inputted from said threaded queue buffer, while suspending said cyclic reading from the top of said list;

said Elastic Refresh Buffer cyclically reading from the top of said list, old vector segment words to be purged from the Elastic Refresh Buffer, while suspending said cyclic rewriting at the bottom of said list;

a symbol generator having an input connected to said Elastic Refresh Buffer for accepting the vector segment words cyclically outputted thereby, which decode the symbol code in each vector word from said symbol set stored therein, and generates a pattern of raster illumination signals corresponding to the vector segment to be depicted;

a Partial Raster Assembly Storage having an input connected to said symbol generator for accepting said pattern of raster illumination signals and storing said pattern ordered by values of X and Y, for readout and display;

said symbol generator transmitting to said Partial Raster Assembly Storage the (X, Y) origin for the vector segment to be displayed to serve as the location segment to be displayed to serve as the location address for said pattern of signals, stored in the Partial Raster Assembly Storage;

said symbol generator transmitting to said Partial Raster Assembly Storage the length of the vector segment to be displayed, to serve as a signal for selectively truncating said pattern of signals stored in the Partial Raster Assembly Storage;

a digital television monitor having an input connected to said Partial Raster Assembly Storage for accepting said pattern of signals stored therein, for illumination of the display;

whereby the vector to be represented is displayed as a connected sequence of vector segments on a digital television monitor.

* * * * *